United States Patent
Kim et al.

(10) Patent No.: US 11,483,871 B2
(45) Date of Patent: Oct. 25, 2022

(54) METHOD AND APPARATUS FOR RANDOM ACCESS IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Anil Agiwal, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/910,963

(22) Filed: Jun. 24, 2020

(65) Prior Publication Data
US 2020/0413450 A1    Dec. 31, 2020

(30) Foreign Application Priority Data

Jun. 26, 2019 (KR) .................. 10-2019-0076566
Sep. 11, 2019 (KR) .................. 10-2019-0112893

(51) Int. Cl.
*H04W 74/08* (2009.01)
*H04W 36/08* (2009.01)

(52) U.S. Cl.
CPC ....... *H04W 74/0833* (2013.01); *H04W 36/08* (2013.01)

(58) Field of Classification Search
CPC ............ H04W 74/0833; H04W 36/08; H04W 36/0077; H04W 74/006
See application file for complete search history.

(56) References Cited

U.S. PATENT DOCUMENTS

| | | | |
|---|---|---|---|
| 2017/0164250 A1 | 6/2017 | Kim et al. | |
| 2018/0279186 A1* | 9/2018 | Park | H04W 36/30 |
| 2019/0253986 A1* | 8/2019 | Jeon | H04B 7/0695 |
| 2020/0146069 A1* | 5/2020 | Chen | H04W 52/362 |
| 2020/0314913 A1* | 10/2020 | Rastegardoost | H04W 74/04 |

OTHER PUBLICATIONS

U.S. Appl. No. 62/754,589, Specification, filed Nov. 2, 2018 (Year: 2018).*
U.S. Appl. No. 62/825,645, Specification, filed Mar. 28, 2019 (Year: 2019).*

(Continued)

*Primary Examiner* — Chi H Pham
*Assistant Examiner* — Ji-Hae Yea
(74) *Attorney, Agent, or Firm* — The Farrell Law Firm, P.C.

(57) ABSTRACT

The disclosure relates to a communication technique for converging a 5G communication system for supporting a higher data transfer rate beyond a 4G system with an IoT technology, and a system therefor. The disclosure may be applied to intelligent services based on a 5G communication technology and an IoT-related technology. A method of a terminal is provided that includes receiving, from a source base station, configuration information for a handover to a target base station, the configuration information including information on at least one of a first type random access procedure and a second type random access procedure, identifying a type of random access procedure based on the configuration information, and performing a random access procedure to the target base station based on the identified type.

20 Claims, 29 Drawing Sheets

(56) References Cited

OTHER PUBLICATIONS

U.S. Appl. No. 62/631,332,Specification,filed Feb. 15, 2018 (Year: 2018).*
3GPP TS 38.321 V15.7.0; 3rd Generation Partnership Project; Technical Specification Group Radio Access Network; NR; Medium Access Control (MAC) protocol specification (Release 15) (Sep. 2019).
3GPP TS 38.214 V15.7.0; 3rd Generation Partnership Project; Technical Specification Group Radio Access Network; NR; Physical layer procedures for data (Release 15) (Sep. 2019).
3GPP TS 38.304 V15.5.0; 3rd Generation Partnership Project; Technical Specification Group Radio Access Network; NR; User Equipment (UE) procedures in Idle mode and RRC Inactive State (Release 15) (Sep. 2019).
3GPP TS 38.331 V15.9.0; 3rd Generation Partnership Project; Technical Specification Group Radio Access Network; NR; Radio Resource Control (RCC) protocol specification (Release 15) (Mar. 2020).

* cited by examiner

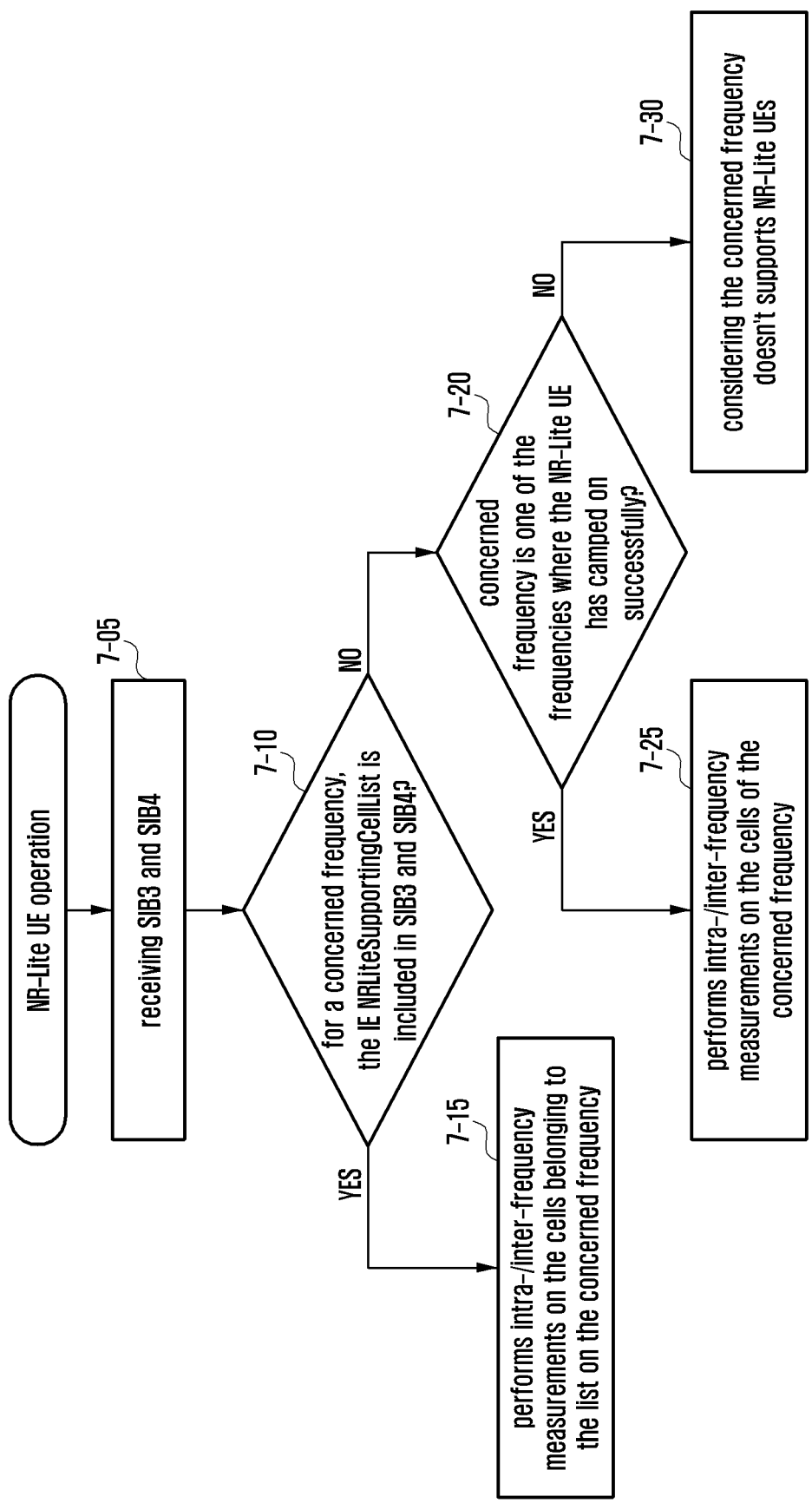

METHOD AND APPARATUS FOR RANDOM ACCESS IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2019-0076566 and 10-2019-0112893, which were filed in the Korean Intellectual Property Office on Jun. 26, 2019 and Sep. 11, 2019, respectively, the entire disclosure of each of which is incorporated herein by reference.

BACKGROUND

1. Field

The disclosure relates generally to an operation of a user equipment (UE) and a base station in a mobile communication system, and more particularly, to a method and apparatus for supporting idle mode mobility in a next-generation mobile communication system. In addition, the disclosure relates to a method and apparatus for random access in a wireless communication system.

2. Description of Related Art

To meet the increasing demand for wireless data traffic since deployment of 4$^{th}$ generation (4G) communication systems, efforts have been made to develop an improved 5th generation (5G) or pre-5G communication system. The 5G or pre-5G communication system may also be called a "beyond 4G network" or a "post long-term evolution (LTE) system". The 5G communication system is intended to be implemented in higher frequency (mmWave) bands, e.g., 60 GHz bands, to accomplish higher data rates.

To decrease propagation loss of the radio waves and increase transmission distance, beamforming, massive multiple-input multiple-output (MIMO), full dimensional MIMO (FD-MIMO), array antenna, an analog beam forming, large scale antenna techniques are being discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc.

In the 5G system, hybrid FSK and QAM modulation (FQAM) and sliding window superposition coding (SWSC) have been developed as an advanced coding modulation (ACM), and filter bank multi carrier (FBMC), non-orthogonal multiple access (NOMA), and sparse code multiple access (SCMA) have been developed as an advanced access technology.

The Internet is now evolving to the Internet of things (IoT) where distributed entities, i.e., things, exchange and process information without human intervention. The Internet of everything (IoE) has also emerged, which is a combination of the IoT technology and big data processing technology through connection with a cloud server.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been recently researched. Such an IoT environment may provide intelligent Internet technology services that collect and analyze data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

A new radio (NR)-Lite UE, which is a low-cost and low-performance UE, is supported in a next-generation mobile communication system. Since the NR-Lite UE supports limited subcarrier spacing (SCS), frequency bandwidth, and maximum data rate for cost reduction, the NR-Lite UE should determine a cell, among neighboring cells, which can support the NR-Lite UE through a predetermined procedure.

In addition, since various services can be provided according to the details described above and the development of a mobile communication system, there is a need for a method for effectively providing the various services. For example, there is a need for a method for random access in a wireless communication system.

SUMMARY

An aspect of the disclosure is to provide a method and an apparatus for determining, by an NR-Lite UE, a cell supporting the NR-Lite UE, and providing information for the NR-Lite UE to measure neighboring cells through system information.

Another aspect of the disclosure is to provide a method and an apparatus for random access in a wireless communication system.

Another aspect of the disclosure is to provide a method and an apparatus for reporting two-step random access information in a next-generation mobile communication system.

Another aspect of the disclosure is to provide a method and an apparatus for performing a handover based on two-step random access in a next-generation mobile communication system.

In accordance with an aspect of the disclosure, a method of a terminal is provided. The method includes receiving, from a source base station, configuration information for a handover to a target base station, the configuration information including information on at least one of a first type random access procedure and a second type random access procedure, identifying a type of random access procedure based on the configuration information, and performing a random access procedure to the target base station based on the identified type of random access procedure.

In accordance with another aspect of the disclosure, a method of a target base station is provided. The method includes receiving, from a source base station, message requesting a handover from the source base station to the target base station, and transmitting, to the source base station, configuration information including information on at least one of a first type random access procedure and a second type random access procedure. The configuration information is transmitted from the source base station to a terminal, and a type of random access procedure performed by the terminal to the target base station is based on the configuration information.

In accordance with another aspect of the disclosure, a method of a source base station is provided. The method includes transmitting, to a target base station, message requesting a handover from the source base station to the target base station, receiving, from the target base station, configuration information including information on at least one of a first type random access procedure and a second type random access procedure, and transmitting, to a terminal, the configuration information. A type of random access procedure performed by the terminal to the target base station is based on the configuration information.

In accordance with another aspect of the disclosure, a terminal is provided. The terminal includes a transceiver and a controller configured to receive, from a source base station, configuration information for a handover to a target base station, the configuration information including information on at least one of a first type random access procedure and a second type random access procedure, identify a type of random access procedure based on the configuration information, and perform a random access procedure to the target base station based on the identified type of random access procedure.

In accordance with another aspect of the disclosure, a target base station is provided. The target base station includes a transceiver and a controller configured to receive, from a source base station, message requesting a handover from the source base station to the target base station, and transmit, to the source base station, configuration information including information on at least one of a first type random access procedure and a second type random access procedure. The configuration information is transmitted from the source base station to a terminal, and a type of random access procedure performed by the terminal to the target base station is based on the configuration information.

In accordance with another aspect of the disclosure, a source base station is provided. The source base station includes a transceiver and a controller configured to transmit, to a target base station, message requesting a handover from the source base station to the target base station, receive, from the target base station, configuration information including information on at least one of a first type random access procedure and a second type random access procedure, and transmit, to a terminal, the configuration information. A type of random access procedure performed by the terminal to the target base station is based on the configuration information.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 7 is a flowchart illustrating a UE process in which an NR-Lite UE determines a cell reselection frequency according to an embodiment;

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure, Therefore, it should be apparent to those skilled in the art that various changes and modifications of the embodiments described herein can be made without departing from the scope and spirit of the disclosure.

In the following description, a detailed description of known functions or configurations incorporated herein will be omitted when it may make the subject matter of the disclosure unnecessarily unclear.

Figure 1:
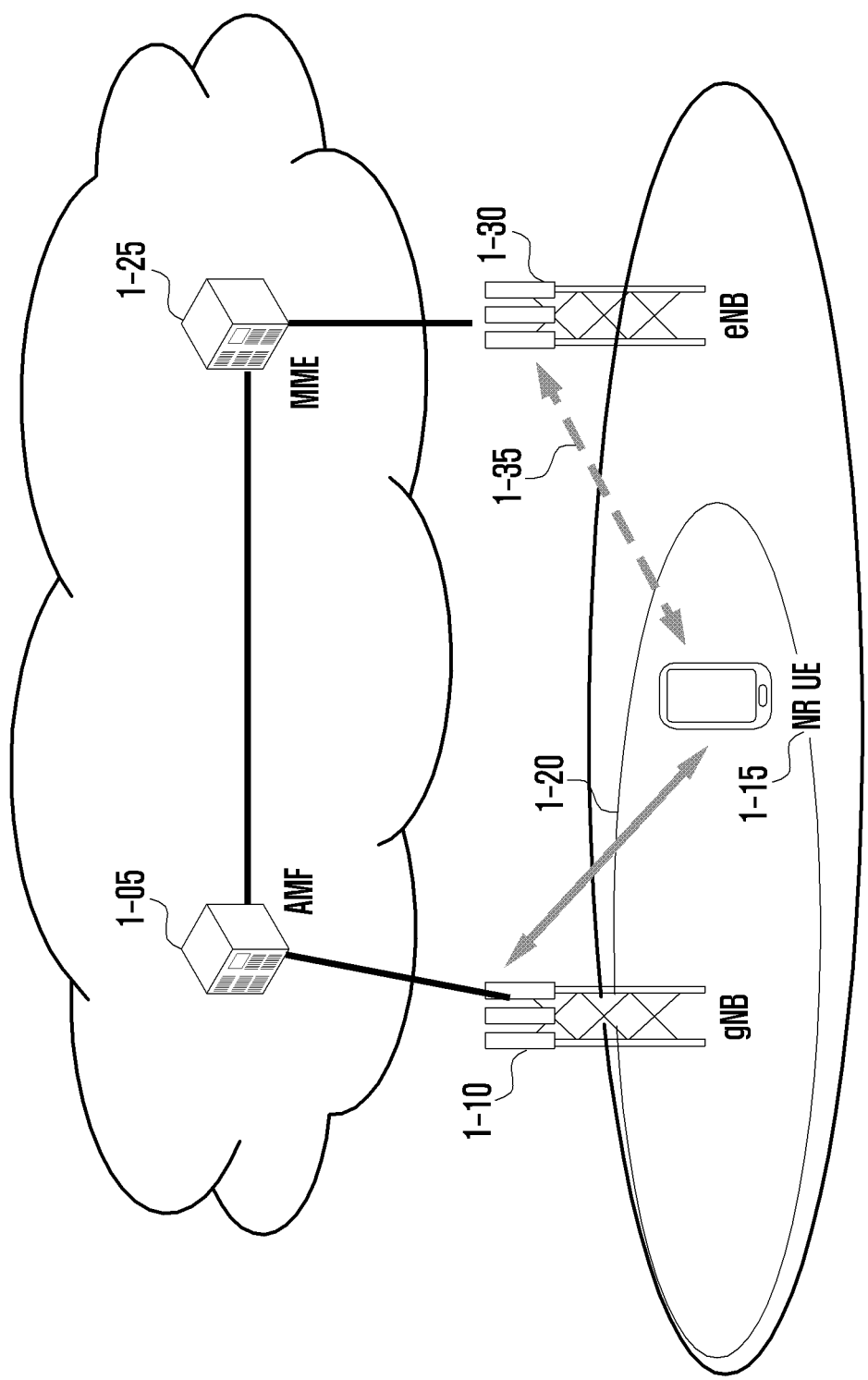
FIG. 1 illustrates a next-generation mobile communication system.

FIG. 1 illustrates a next-generation mobile communication system.

Referring to FIG. 1, a radio access network of a next-generation mobile communication system (e.g., NR) includes a next-generation base station (NR node B, hereinafter referred to as a gNB) 1-10 and an access and mobility management function (AMF) (a new radio core network) 1-05. A UE (hereinafter referred to as an NR UE or a UE) 1-15 is connected to an external network through the gNB 140 and the AMF 1-05.

In FIG. 1, the gNB corresponds to an evolved node B (eNB) of the existing LTE system. The gNB is connected to the NR UE through a radio channel and can provide better service than that of an existing node B (indicated by reference numeral 1-20). In the next-generation mobile communication system, since all user traffic is serviced through a shared channel, a device for collecting and scheduling state information, such as buffer states, available transmission power states, and channel states of UEs is required, and gNB 1-10 is used to perform such a function of the device. In general, one gNB usually controls multiple cells.

In order to implement ultra-high-speed data transmission compared to the existing LTE, the NR system may include a bandwidth that is greater than or equal to the existing maximum bandwidth, use orthogonal frequency division multiplexing (OFDM) as a radio access technology (RAT), and combine additional beamforming technology. In addition, the NR system adopts an adaptive modulation & coding (AMC) scheme for determining a modulation scheme and a channel coding rate according to the state of a channel used by a terminal. The AMF 1-05 performs functions such as mobility support, bearer setup, and quality of service (QoS) setup. The AMF is a device that is responsible for various control functions as well as mobility management functions for. UEs, and is connected to multiple base stations. In addition, the next-generation mobile communication system may be linked with the existing UE system, and the AMF is connected to a mobility management entity (MME) 1-25 through a network interface. The MME is connected to an eNB 1-30, which is an existing base station. A UE supporting LTE-NR dual connectivity may transmit or receive data while maintaining a connection to the eNB as well as the gNB (as indicated by reference numeral 1-35).

Figure 2:
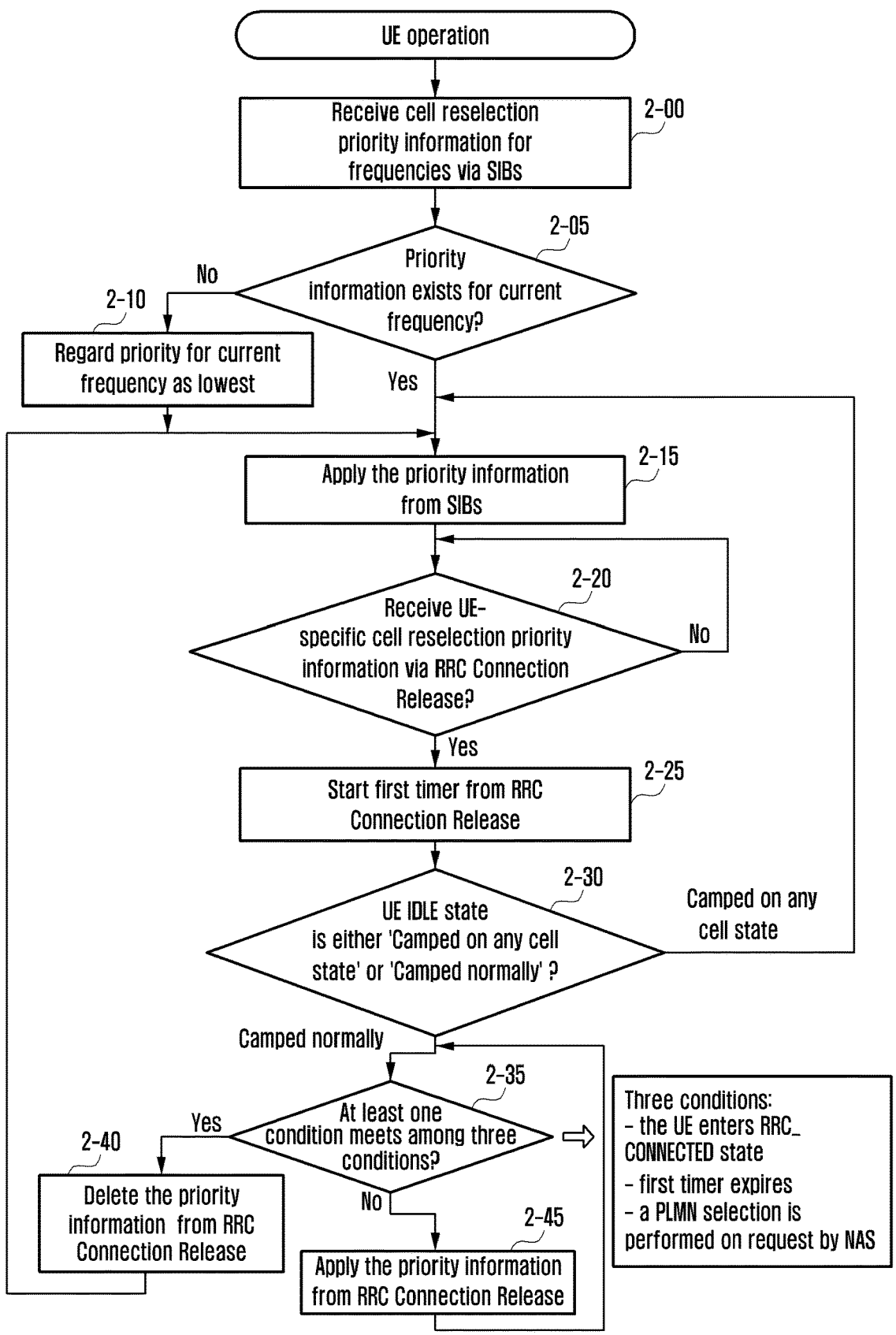
FIG. 2 is a flow chart illustrating a process in which frequency-specific priority information for cell reselection is broadcasted via a system information block (SIB) or applied to a specific UE through a radio resource control (RRC) connection release message that is dedicated RRC signaling in an existing LTE technology.

FIG. 2 is a flow chart illustrating a process in which frequency-specific priority information for cell reselection is broadcasted via an SIB in an existing LTE technology or applied to a specific UE through an RRC connection release message, which is dedicated RRC signaling.

Cell reselection is a process of reselecting a serving cell in order for a mobile UE to be connected to a cell having the best channel state. A network gives priority to each frequency to control cell reselection of UEs which are in an idle mode. For example, if one UE receives priority information for two frequencies f1 and f2, and f1 has a higher priority than that of f2, the probability in which the UE stays at frequency f1 increases. In addition, even if the UE is in frequency f2, if the channel state of f2 is not good, the UE attempts to change to frequency f1. Priority information for a frequency is broadcasted via an SIB or provided to a specific UE through an RRC connection release message which is dedicated RRC signaling, Even if the UE already includes priority information for frequencies via the SIB, if UE-specific priority information is provided through RRC signaling, the priority information of the SIB is ignored.

Priority information for each frequency is transmitted through cellReselectionPriority information element (IE) described as described below and is given one of a total of X+1 levels of priority. The smaller the value, the lower the priority, i.e., '0' denotes the lowest priority.

CellReselectionPriority IE

```
-- ASN1START
-- TAG-CELLRESELECTIONPRIORITY-START
CellReselectionPriority ::=                INTEGER (0..7)
-- TAG-CELLRESELECTIONPRIORITY-STOP
-- ASN1STOP
```

Frequencies between RATs cannot be given the same priority. If the idle state of a UE indicates "camped on any cell state", frequency priority information received via the SIB is applied, and priority information received through RRC signaling is only stored and not used. A CellReselectionPriority IE is an optional IE and may not exist. In this case, priority information for the corresponding frequency is not given. At this time, the UE regards the priority of the corresponding frequency as the lowest level.

Referring to FIG. 2, in step 2-00, the UE receives priority information for frequencies used in other RATs, via an SIB, as well as evolved universal terrestrial radio access (EU-TRA). However, priority information is not necessarily provided for all frequencies. Priority information for the frequency of a serving cell currently camped on may also not be provided.

In step 2-05, the UE checks priority information received via the SIB. If priority information for the frequency of the current serving cell is not provided, the priority of the frequency is regarded as the lowest level in step 2-10.

If priority information for the frequency of the current serving cell is provided in step 2-05, the UE applies priority information for respective frequencies in step 2-15. If the UE receives an RRC connection release message from a base station, a mode of the UE is switched from a connected mode to an idle mode. The RRC message may include priority information for frequencies. The message is UE-specific information, and is generally first applied before frequency priority information provided from the SIB.

In step 2-20, the UE checks whether the RRC message includes frequency priority information. If the RRC message includes frequency priority information, the UE applies a first timer value, which is included in the RRC message, and starts a first timer in step 2-25.

In step 2-30, the UE determines whether the current idle mode state is "camped on any cell state" or "camped normally state". "Camped normally state" refers to a state in which the UE is camped on a suitable cell. A suitable cell is a cell that can provide a general service to a UE, and is a cell satisfying the detailed conditions as follows:

A cell corresponds to a selected public land mobile network (PLMN), a registered PLAN, or one PLMN in an equivalent PLMN list;

Unbarred cells;

Cells satisfying cell selection criterion;

"Camped on any cell state" refers to a state in which a UE does not camp on a suitable cell and thus camps on an acceptable cell. In the acceptable cell, a general service is not available, and only an emergency call can be attempted by the UE. The acceptable cell is a cell that satisfies the following conditions:

Unbarred cells; and

Cells satisfying a cell selection criterion.

If the UE is in the idle state of the "camped on any cell state", the process returns to step 2-15 and the UE applies the frequency priority information provided from the SIB instead of the priority information provided from the RRC connection release message. If the UE is in the idle state of the "camped normally", the UE determines whether at least one of the following three conditions is satisfied in step 2-35.

Three conditions are as follows:

A UE is switched to a connected mode;

A first timer has expired; and

A PLMN selection process is performed according to an NAS request

If one of the above conditions is satisfied, the UE discards the priority information provided from the RRC connection release message in step 2-40 and returns to step 2-15 to apply the frequency priority information provided from the SIB. Otherwise, if none of the above conditions are satisfied, the UE applies priority information provided from the RRC connection release message in step 2-45.

The frequency priority information affects the measurement of a specific frequency by the UE, The UE always performs measurement for a frequency having a higher priority than that of the current serving cell. However, for the same frequency (intra-frequency) as that of the serving cell or other frequencies having a priority less than or equal to that of the serving cell, the UE may not always perform measurement for the corresponding frequency in order to save UE power. In this case, whether measurement is to be performed is determined if the channel QoS of the serving cell has a value lass than or equal to a specific threshold value. Cell reselection is performed in order for the UE to move to a cell having a good channel state, and thus, if the channel QoS of the current serving cell is good, there is no reason to move to a cell having a frequency having the same or lower priority. Therefore, in order to reduce power consumption due to unnecessary channel measurement, whether a measurement is to be performed is determined based on a specific threshold value.

In the case of the same frequency (intra-frequency), if the QoS of the serving cell has a value less than or equal to a specific threshold (Sintrasearch), channel measurement is performed for other cells having the same frequency. For other frequencies having the same or lower priority, if the QoS of the serving cell has a value less than or equal to that of a specific threshold (Snonintrasearch), channel measurements are performed for cells of the corresponding different frequencies. Channel QoS generally considers reference signal received power (RSRP) and reference signal received quality (RSRQ).

While performing the measurement as described above, if the channel QoS of a cell of a frequency having a high priority has a value higher than a specific threshold (ThreshX-high), the UE reselects a cell having a high priority as a serving cell. If the channel QoS of a cell of a frequency having a low priority has a value higher than a specific threshold (ThreshX-low) and the QoS of the serving cell is lower than a ThreshServing-low, the UE reselects a cell having a low priority frequency as a serving cell.

Figure 3:
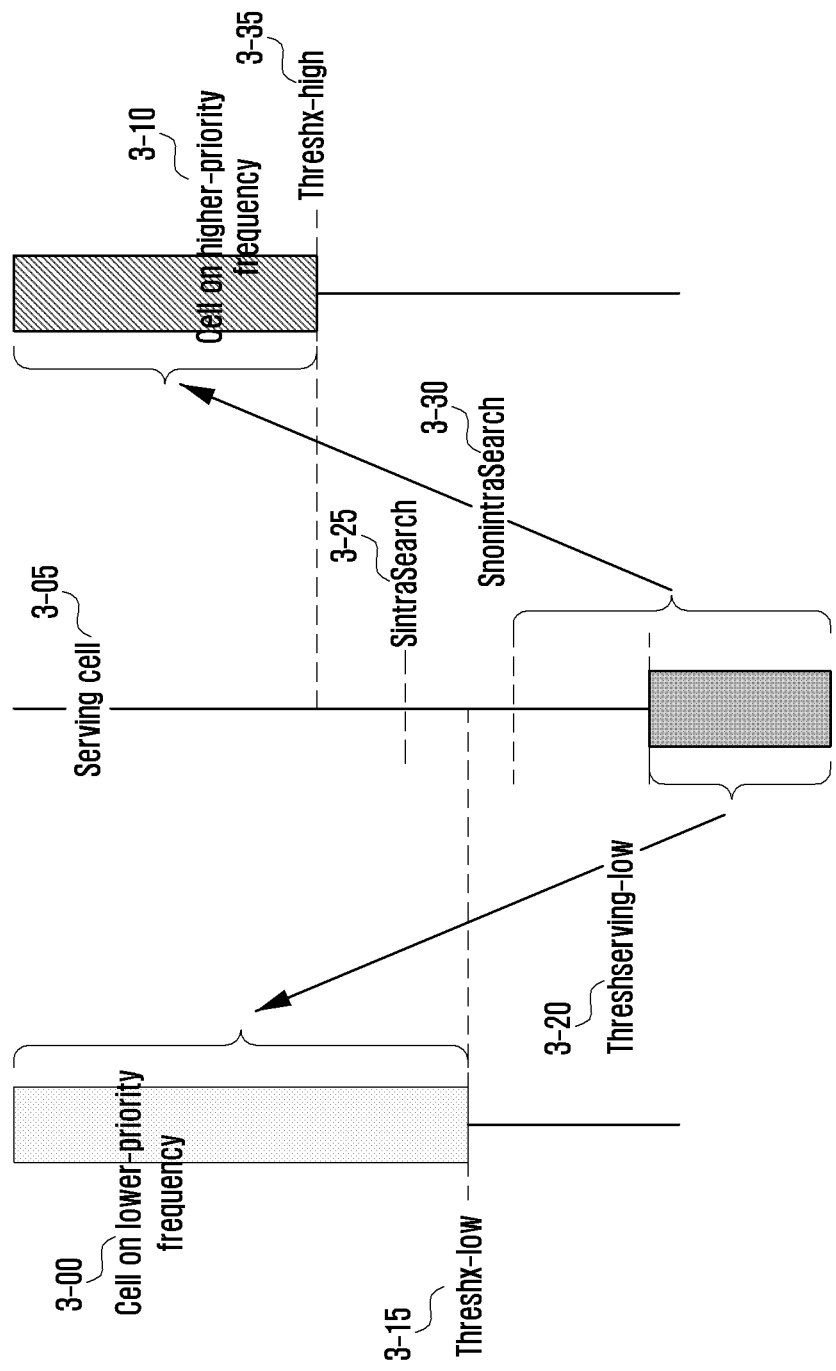
FIG. 3 illustrates a method for performing cell reselection by a UE according to an embodiment.

FIG. 3 illustrates a method for performing cell reselection by a UE in the disclosure.

Referring to FIG. 3, the UE performs an inter-freq/RAT measurement for a frequency having a high priority or an RAT at all times, regardless of a measured signal strength for the serving cell. If the measured signal strength for the serving cell is lower than SintraSearch 3-25, the UE performs an intra-freq measurement. If the measured signal strength for the serving cell is lower than SnonintraSearch 3-30, the UE performs the inter-freq/RAT measurement with respect to a frequency having a priority that is the same as or lower than a frequency of the current serving cell. By triggering measurement stepwise by the UE in this way, the power consumption of the UE, which is caused by measurement with respect to a neighboring cell, may be reduced. If a channel QoS of a cell 3-10 of a frequency having a high priority increases above a specific threshold (ThreshX-high) 3-35, the UE re-selects a cell of a frequency having a high priority as a serving cell. If a channel QoS of a cell 3-00 of a frequency having a low priority increases above a specific threshold (ThreshX-low 3-15) and a QoS of a serving cell becomes lower than ThreshServing-low 3-20, the UE reselects a cell of a frequency having a low priority as the serving cell.

In cell reselection, the RSRP or the RSRQ may be considered. The RSRP or the RSRQ may denote a value calculated by S-criteria. That is, the RSRP or the RSRQ may be Srxlev or Squal.

$$Srxlev = Qrxlev\text{meas} - (Qrxlev\min + Qrxlev\text{minoffset}) - P\text{compensation} - Q\text{offsettemp}$$

$$Squal = Q\text{qualmeas} - (Q\text{qualmin} + Q\text{qualminoffset}) - Q\text{offsettemp}$$

| | |
|---|---|
| Srxlev | Cell selection reception (RX) level value (dB) |
| Squal | Cell selection quality value (dB) |
| Qoffset$_{temp}$ | Offset temporarily applied to a cell as specified in TS 38.331 (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports supplementary uplink (SUL) frequency for this cell, Qrxlevmin is obtained from q-RxLevMinSUL, if present, in SIB1, SIB2 and SIB4, additionally, if Q$_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if Q$_{rxlevminoffsetcell}$ is present in SIB3 and SIB4 for the concerned cell, this cell specific offset is added to the corresponding Qrxlevmin to achieve the required minimum RX level in the concerned cell. |

| | |
|---|---|
| $Q_{qualmin}$ | Minimum required quality level in the cell (dB). Additionally, if $Q_{qualminoffsetcell}$ is signaled for the concerned cell, this cell specific offset is added to achieve the required minimum quality level in the concerned cell. |
| $Q_{rxlevminoffset}$ | Offset to the signaled $Q_{rxlevmin}$ taken into account in the Srxlev evaluation as a result of a periodic search for a higher priority PLMN while camped normally in a visited public land mobile network (VPLMN), as specified in TS 23.122. |
| $Q_{qualminoffset}$ | Offset to the signaled $Q_{qualmin}$ taken into account in the Squal evaluation as a result of a periodic search for a higher priority PLMN while camped normally in a VPLMN, as specified in TS 23.122. |
| $P_{compensation}$ | If the UE supports the additionalPmax in the NR-NS-PmaxList, if present, in SIB1, SIB2 and SIB4:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else: $\max(P_{EMAX1} - P_{PowerClass}, 0)$ (dB) |
| $P_{EMAX1}, P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331, else $P_{EMAX1}$ and $P_{EMAX2}$ are obtained from the p-Max and NR-NS-PmaxList respectively in SIB1, SIB2 and SIB4 for normal uplink (UL) as specified in TS 38.331. |
| $P_{PowerClass}$ | Maximum radio frequency (RF) output power of the UE (dBm) according to the UE power class as defined in TS 38.101-1. |

In the case of inter-RAT cell reselection to NR, Srxlev is used, and a value of the Srxlev is compared with ThreshX-high or ThreshX-low. In the disclosure, if the LTE base station provides a q-RxLevMinSUL value for a specific NR frequency through system information, and if the UE supports SUL, at the time of performing inter-RAT cell reselection to an NR cell belonging to the NR frequency, the Srxlev value may be derived by applying the q-RxLevMinSUL value, as the Qrxlevmin value of the Srxlev. The q-RxLevMinSUL value is provided for each NR frequency and if NR cells belonging to a specific NR frequency support SUL, a q-RxLevMinSUL value for the specific NR frequency is provided. For the NR frequency that cannot support SUL, the q-RxLevMinSUL value is not provided. When using the received signal quality, i.e., RSRQ, the base station separately provides Threshserving-lowQ, ThreshX-lowQ, and ThreshX-highQ to the UE by using broadcasting. When using received signal strength, Threshserving-lowP, ThreshX-lowP, and ThreshX-highP are used.

The next-generation mobile communication system is considering low-cost and low-performance UE support. The LTE system may support UEs having the same concept, referred to as MTC and narrow band (NB)-IoT. In the next-generation mobile communication system, the low-cost and low-performance UE is referred to as an NR-Lite UE, The NR-Lite UE is expected to support limited SCS, frequency bandwidth, maximum data rate, and frequency range (e.g., support only FR1) for the cost reduction, and thus performance deterioration compared to a general terminal is inevitable. For example, the NR-Lite UE may have limited specifications and performance having an SCS of 15 KHz, a 5 MHz frequency bandwidth, and data rates up to several MHz.

Among the next-generation mobile communication systems, cells that can support the NR-Lite UE and cells that cannot support the same may coexist. Therefore, the NR-Lite UE should determine a cell, among neighboring cells, which can support the NR-Lite UE itself through a predetermined procedure.

The disclosure provides a procedure in which an NR-Lite UE determines a cell supporting the NR-Lite UE. In addition, the disclosure provides a method for providing information necessary for the NR-Lite UE to measure neighboring cells through system information.

Figure 4:
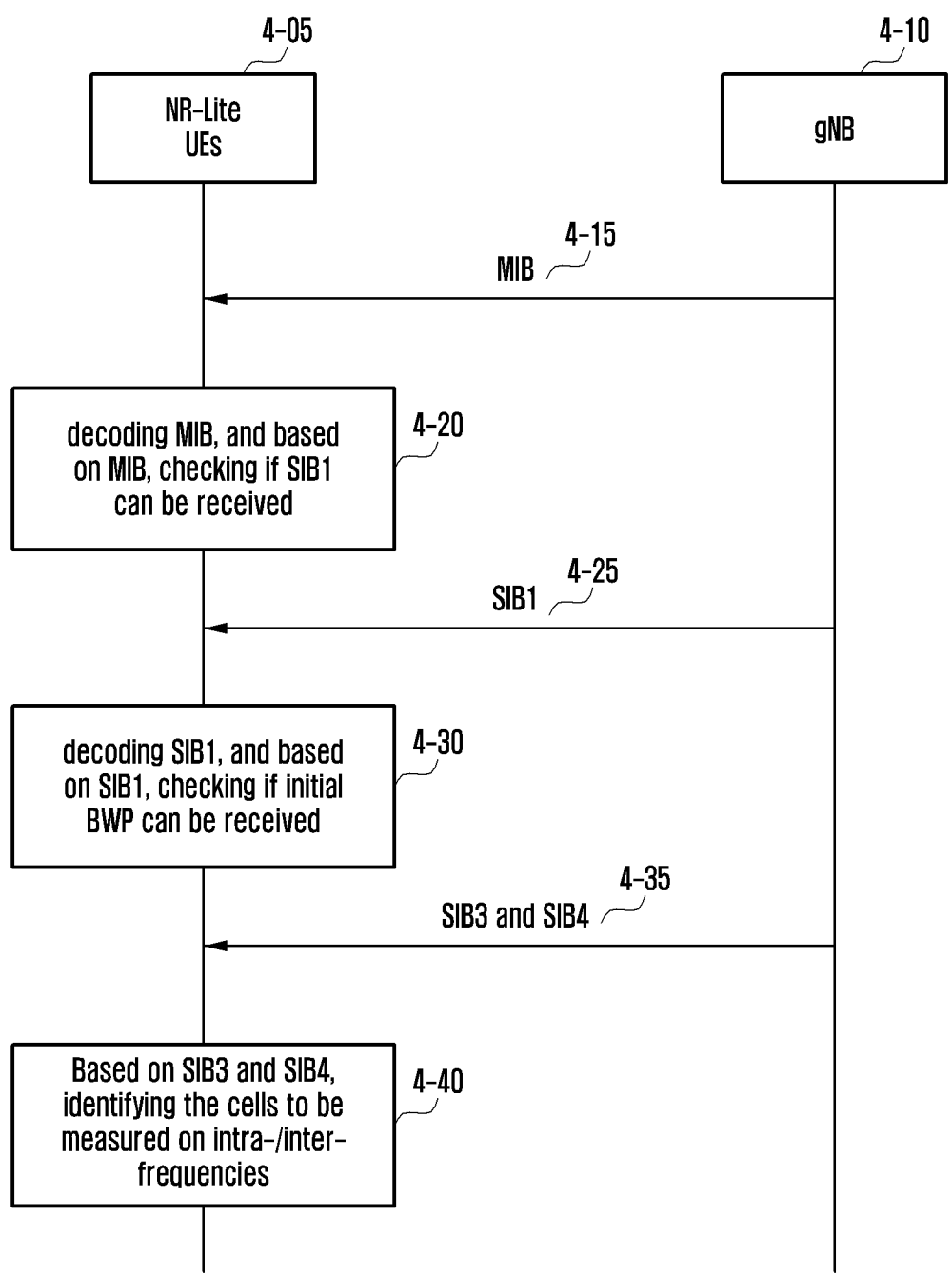
FIG. 4 is a flowchart illustrating a process in which an NR-Lite UE receives system information from a specific cell according to an embodiment.

FIG. 4 illustrates a process in which an NR-Lite UE receives system information from a specific cell according to an embodiment.

Referring to FIG. 4, an NR-Lite UE 4-05 selects a cell 4-10 that satisfies the S-Criteria. The UE 4-05 receives a master information block (MIB) from the cell 4-10 in step 4-15.

The following pieces of information may be stored in the MIB.

```
MIB ::=                        SEQUENCE {
    systemFrameNumber              BIT STRING (SIZE (6)),
    subCarrierSpacingCommon        ENUMERATED {scs15or60, scs30or120},
    ssb-SubcarrierOffset           INTEGER (0..15),
    dmrs-TypeA-Position            ENUMERATED {pos2, pos3},
    pdcch-ConfigSIB1               PDCCH-ConfigSIB1,
    cellBarred                     ENUMERATED {barred, notBarred},
    intraFreqReselection           ENUMERATED {allowed, not Allowed},
    spare                          BIT STRING (SIZE (1))
}
```

In step 4-20, the UE determines whether it can receive an SIB1, broadcasted by the cell, through a subCarrierSpacingCommon field and a physical downlink control channel (pdcch)-ConfigSIB1 field among the information. The subCarrierSpacingCommon indicates SIB1, msg2 (random access response (RAR)) and msg4 in the random access process, and SCS information applied to the SI message. The pdcch-ConfigSIB1 includes a 4-bit ControlResourceSetZero and a 4-bit SearchSpaceZero, and the ControlResourceSetZero indicates the maximum frequency bandwidth of CORESET, The UE determines whether the cell supports the SCS and frequency bandwidth of the UE itself through the information. If the cell cannot support the SCS and frequency bandwidth of the UE, the UE performs an operation related to "essential SI missing". The "essential SI missing" related operation is an operation performed if the UE does not successfully receive the essential system information (SI), MIB or SIB1.

A cell supporting NR-Lite may receive a separate indicator indicating whether to support the NR-Lite UE in the MIB. Alternatively, the SCS, frequency bandwidth, and frequency range (FR), supported for the NR-Lite UE, may be indicated in the MIB.

If the cell supports the SCS and frequency bandwidth of the UE, SIB1 broadcasted from the cell is received in step 4-25. In the SIB1, bandwidth information of the uplink/downlink initial band width part (BWP) of the cell is stored.

In step 4-30, the UE determines whether the cell supports the bandwidth information of the initial BWP or more. If the cell cannot support the bandwidth information of the initial BWP, the UE performs an operation related to "essential SI missing". The "essential SI missing" related operation is an operation performed if the UE does not successfully receive MIB and SIB1, which are essential SI. If the UE has not successfully received the MIB broadcasted from one cell, the cell is regarded as barred, and cell reselection may be considered for other cells of a frequency to which the cell belongs. If the UE has not successfully received SIB1 broadcasted from one cell, the cell is considered as barred. If the intraFreqReselection field stored in the MIB is configured as Not Allowed, all other cells of the frequency to which the cell belongs are regarded as barred. Otherwise, if the intraFreqReselection field is configured to be allowed, cell reselection may be considered for other cells of the frequency to which the cell belongs.

If the NR-Lite UE cannot receive SIB1 since the NR-Lite UE cannot support the SCS or frequency bandwidth indicated by the MIB, the NR-Lite UE performs the "essential SI missing" operation. Generally, all cells belonging to one frequency are likely to have the same capability. That is, if one cell cannot support NR-Lite, there is a possibility that other cells belonging to a corresponding frequency may not be able to support the NR-Lite UE. Under this assumption, it may not be necessary to consider cell reselection for other cells of the frequency to which the cell belongs, and the UE operation may be performed as if the intraFreqReselection field is configured as not Allowed. That is, if the NR-Lite UE cannot receive the SIB1 since the NR-Lite UE may not be able to support the SCS the frequency bandwidth indicated by the MIB, the current cell as well as other cells belonging to the corresponding frequency may be regarded as barred.

Otherwise, whether the NR-Lite UE is supported may differ for each cell at the same frequency, Under the assumption described above, it is necessary to consider cell reselection for other cells of the frequency to which the cell belongs.

Alternatively, an indicator indicating whether cell reselection for other cells of the frequency to which the cell belongs is to be considered may be received in the MIB (or SIB1). If the indicator indicates to consider cell reselection for other cells, the indication denotes that at least one cell belonging to the same frequency as that of the corresponding cell can support the NR-Lite UE.

In step 4-35, the UE receives information related to intra-/inter-frequency cell reselection from SIB3 and SIB4. The UE performs a cell reselection operation by considering information related to the intra-/inter-frequency cell reselection in step 4-40. Information on a cell list in which the NR-Lite UE should perform intra-/inter-frequency measurement is stored in the information. The cell list is provided for each frequency in order to prevent the NR-Lite UE from measuring cells that cannot support the NR-Lite UE.

In addition, an indicator indicating whether the NR-Lite UE should measure the corresponding frequency may be stored for each frequency. An indicator indicating that frequencies belonging to FR1 or FR2 are excluded from cell reselection candidates may be stored in SIB3 or SIB4.

When the NR-Lite UE has successfully camped-on one frequency; the NR-Lite UE performs intra-/inter-frequency measurement for the frequency in order to perform cell reselection operation thereafter.

Figure 5A:
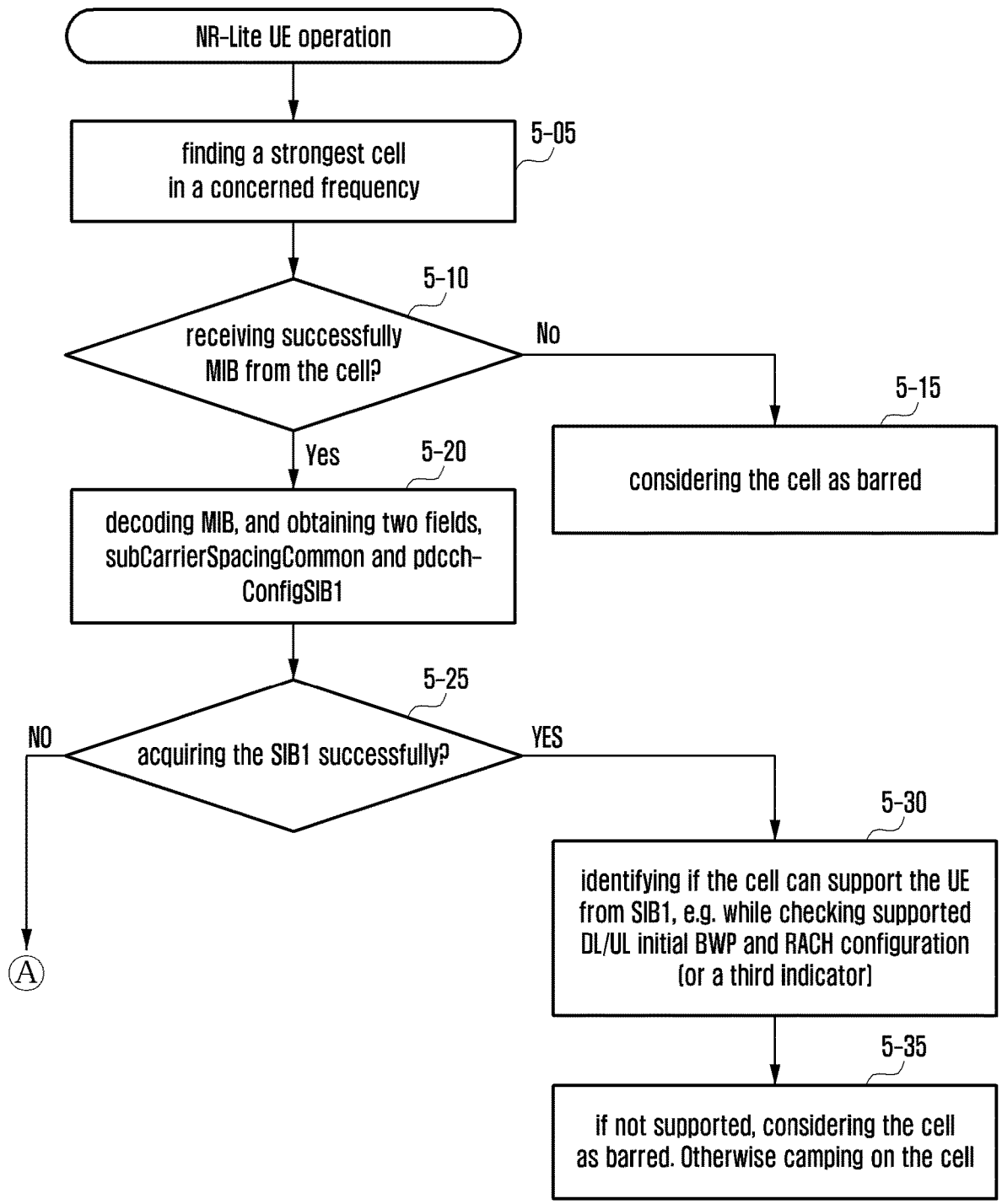
FIGS. 5A and 5B illustrate a flowchart of a UE process for determining a cell accessible by an NR-Lite UE according to an embodiment.
Figure 5B:
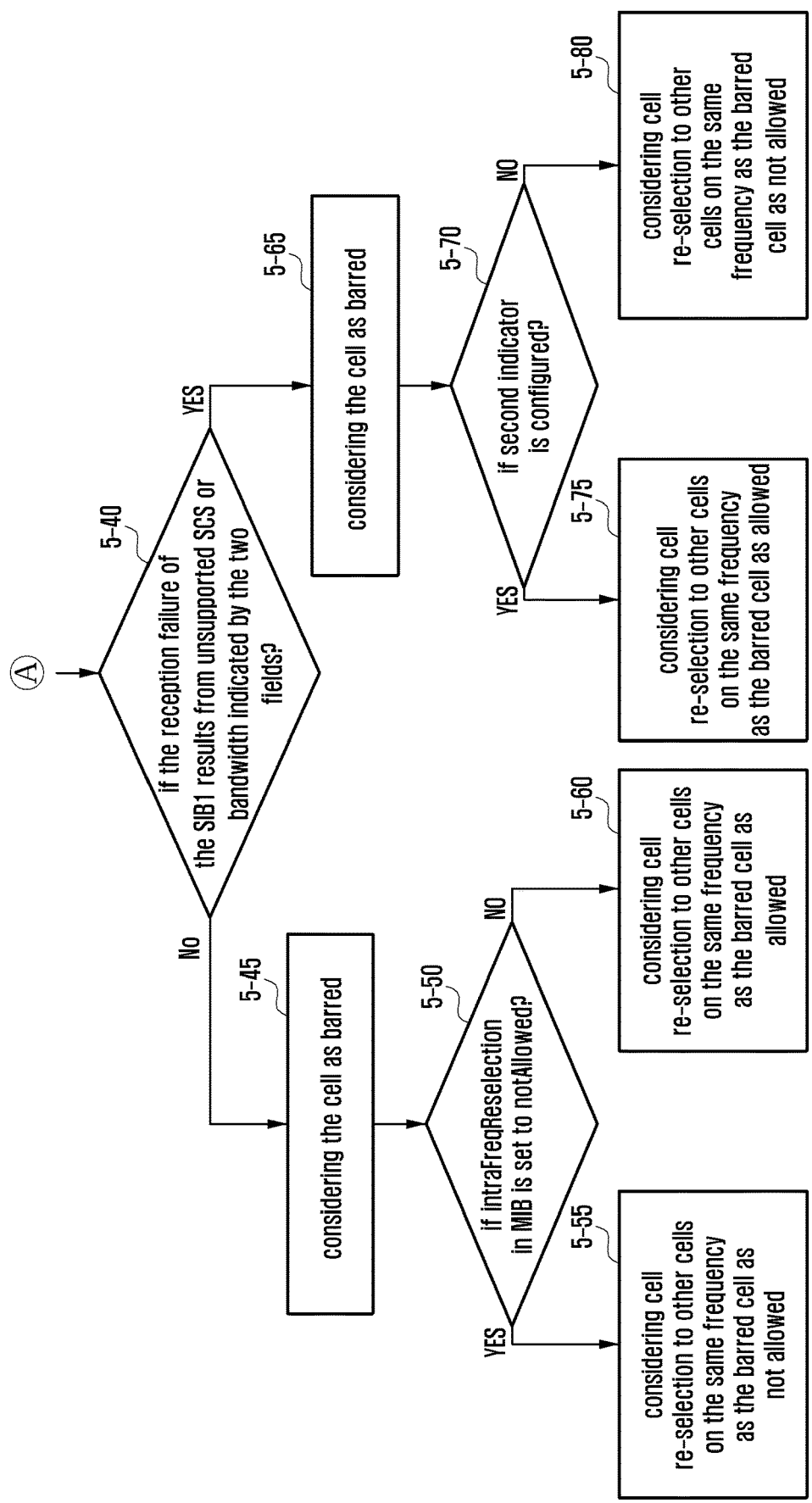

FIGS. 5A and 5B illustrate a flowchart of a UE process for determining a cell accessible by an NR-Lite UE according to an embodiment.

Referring to FIG. 5A, the NR-Lite UE determines a cell accessible by the NR-Lite UE by using only the conventional field information, without including a first indicator in the MIB. The first indicator is for indicating whether the cell supports the NR-Lite UE.

In step 5-05, the UE finds a cell that provides the strongest signal strength at a specific frequency.

In step 5-10, the UE checks whether the MIB broadcasted from the cell has been successfully received.

In step 5-15, when the MIB is not successfully received, the UE regards the cell as barred. However, cell reselection may be considered for other cells of a frequency to which the corresponding cell belongs.

In step 5-20, when the MIB is successfully received, the UE acquires a subCarrierSpacingCommon field and a pdcch-ConfigSIB1 field from the received MIB.

In step 5-25, the UE determines whether acquisition of SIB1 is successful.

In step 5-30, when it is determined that the UE can successfully acquire SIB1, the UE checks the frequency bandwidth information of an uplink/downlink initial BWP included in SIB1 and determines whether the cell supports the frequency bandwidth information of the initial BWP. If the cell cannot support the frequency bandwidth information of the initial BWP, the UE may not camp on the cell. Alternatively, a separate uplink/downlink initial BWP for the NR-Lite UE may be configured in SIB1. At this time, the UE determines whether the cell supports the NR-Lite-dedicated uplink/downlink initial BWP frequency bandwidth. Additionally, the UE may also check whether the UE has the capability of performing random access through RACH configuration information included in SIB1. As another alternative, a third indicator for explicitly indicating whether the cell supports the NR-Lite UE may be included in SIB1.

In step 5-35, if the UE supports the frequency bandwidth of the uplink/downlink initial BWP included in SIB1 (or if the cell is considered to support the NR-Lite UE through configuration information stored in SIB1), the UE camps-on the cell, Otherwise, the UE regards the cell as barred.

Referring to FIG. 5B, in step 5-40, when it is determined that the UE cannot successfully acquire SIB1 in step 5-25, the NR-Lite UE determines whether the reception of SIB1 has failed because the UE cannot support the configuration indicated by the subCarrierSpacingCommon field and the pdcch-ConfigSIB1 field.

In step 5-45, if the UE supports configuration indicated by the subCarrierSpacingCommon field and the pdcch-ConfigSIB1 field, but fails to receive SIB1, the UE regards the cell as barred. For example, this may correspond to when the reception signal is poor or a large interference signal is received and thus the reception of SIB1 has failed.

In step 5-50, the UE determines whether the intraFreqReselection field stored in the MIB is configured as Not Allowed.

In step 5-55, if the intraFreqReselection field is configured as Not Allowed, the UE may not consider, as a cell reselection candidate, other cells of the frequency to which the cell belongs.

In step 5-60, if the intraFreqReselection field is configured as allowed, the UE considers, as a cell reselection candidate, other cells of the frequency to which the cell belongs.

If the UE has failed to receive configuration indicated by the subCarrierSpacingCommon field and the pdcch-ConfigSIB1 field, and thus fails to receive SIB1, the UE regards the cell as barred in operation 5-65. At this time, the cell may be considered as unable to support the NR-Lite UE.

In step 5-70, the UE determines whether a second indicator is configured for the MIB. If the second indicator indicates to consider cell reselection for other cells, the indication denotes that at least one cell belonging to the same frequency as that of the corresponding cell can support the NR-Lite UE.

In step 5-75, when the second indicator is configured, the UE considers other cells of the frequency to which the cell belongs as a cell reselection candidate.

In step 5-80, when the second indicator is not configured, the UE may not consider other cells of the frequency to which the cell belongs as a cell reselection candidate. That is, if the second indicator is not configured, this denotes that there is no other cell supporting NR-Lite at the frequency to which the cell belongs, and in this case, it is not necessary to consider the frequency to which the cell belongs in order to perform cell reselection.

Figure 6A:
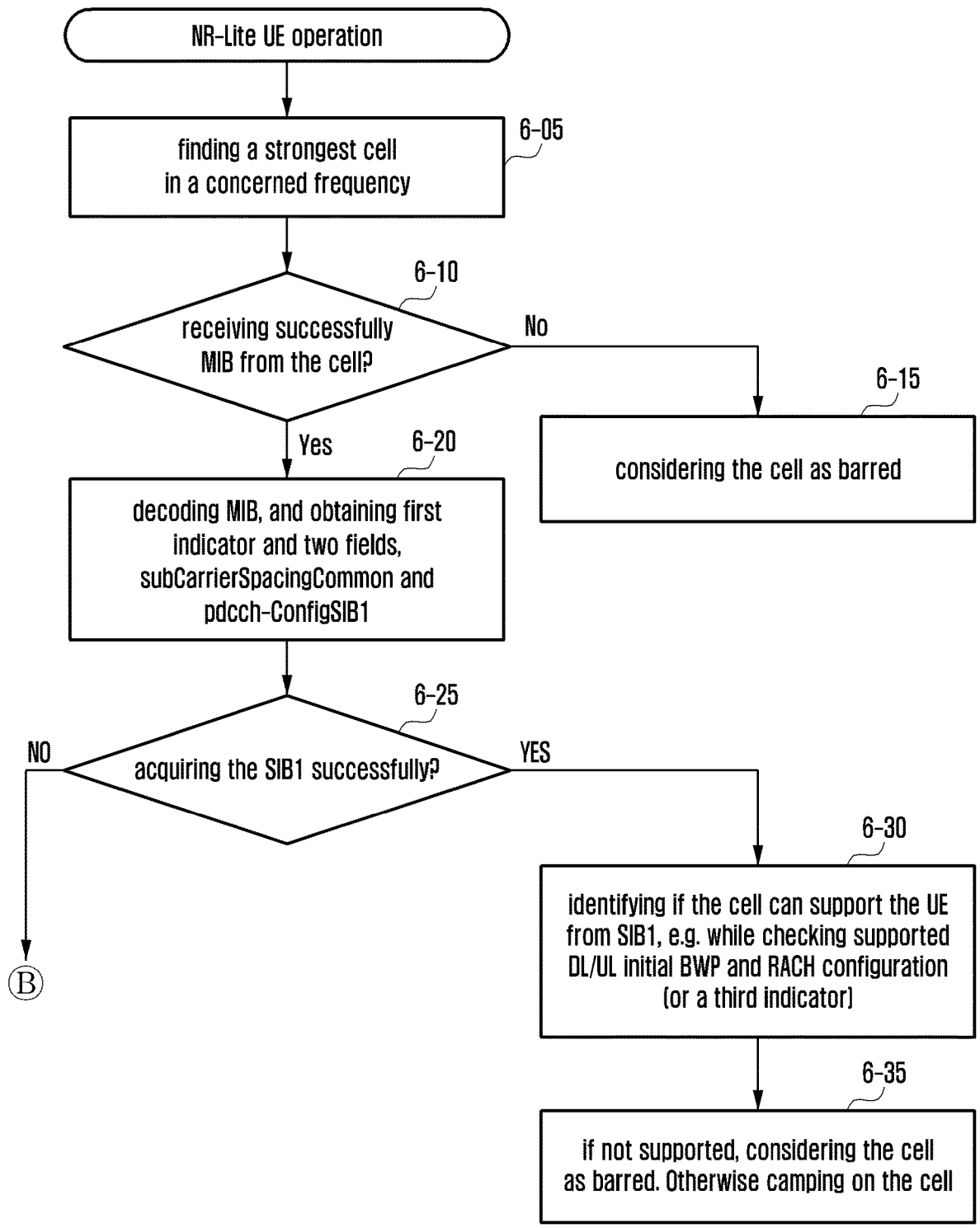
FIGS. 6A and 6B illustrate a flowchart of a UE process for determining a cell accessible by an NR-Lite UE according to an embodiment.
Figure 6B:
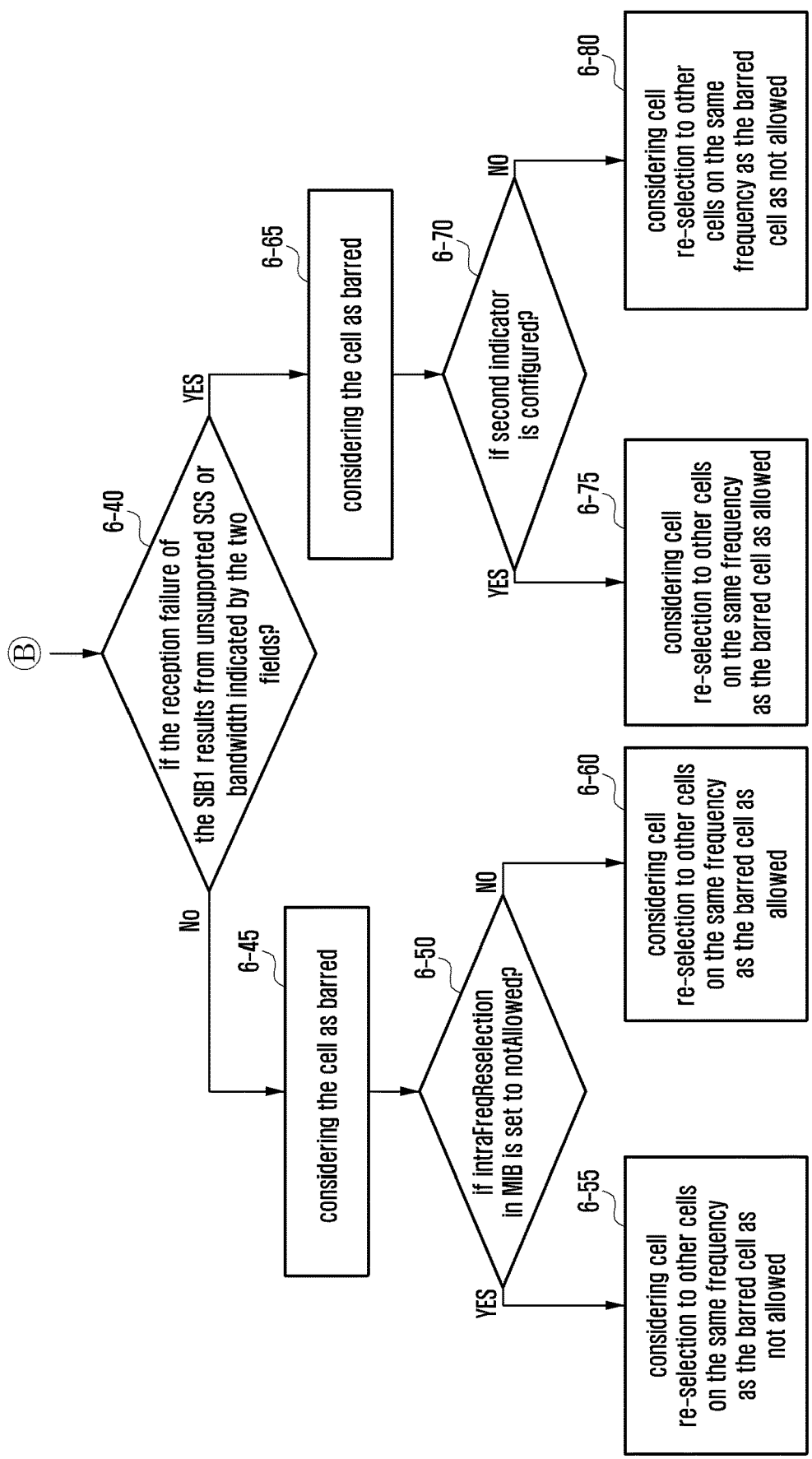

FIGS. 6A and 6B illustrate a flowchart of a UE process for determining a cell accessible by an NR-Lite UE according to an embodiment.

Referring to FIG. 6A, the NR-Lite UE determines a cell accessible by the NR-Lite UE by using the conventional field information together with a first indicator stored in the MIB.

In step 6-05, the UE finds a cell that provides the strongest signal strength at a specific frequency.

In step 6-10, the UE checks whether the MIB broadcasted from the cell has been successfully received.

In step 6-15, when the MIB is not successfully received, the UE regards the cell as barred. However, cell reselection may be considered for other cells of a frequency to which the corresponding cell belongs.

In step 6-20, when the MIB is successfully received, the UE acquires a first indicator, a subCarrierSpacingCommon field, and a pdcch-ConfigSIB1 field from the received MIB. The first indicator indicates whether the cell supports the NR-Lite UE, and may be configured by 1 bit. The first indicator may denote supporting a UE having a minimum UE capability among NR-Lite UEs.

In step 6-25, the UE determines whether acquisition of SIB1 is successful. If the first indicator indicates not supporting the NR-Lite UE, the UE may determine that the SIB1 cannot be successfully acquired.

In step 6-30, when it is determined that acquisition of SIB1 by the UE is successful, the UE checks the frequency bandwidth information of uplink/downlink initial BWP included in SIB1 and determines whether the cell supports the frequency bandwidth information of the initial BWP. Even if the first indicator indicates that the cell supports the NR-Lite UE, since the frequency bandwidth of the uplink/downlink initial BWP may not be supported to be used in specific NR-Lite UEs, a procedure for checking whether the frequency bandwidth of the uplink/downlink initial BWP is supported to be used in the specific NR-Lite UEs is utilized. If the cell cannot support the frequency bandwidth information of the initial BWP, the UE may not camp on the cell. Alternatively, separate uplink/downlink initial BWP for the NR-Lite UE may be configured for the cell, At this time, the UE determines whether the cell supports the NR-Lite-dedicated uplink/downlink initial BWP frequency bandwidth. Additionally, the UE may also check whether the UE has the capability of performing random access through RACH configuration information included in SIB1. As another alternative, a third indicator for explicitly indicating whether the cell supports the NR-Lite UE may be included in SIB1.

In step 6-35, when the UE supports the frequency bandwidth of the uplink/downlink initial BWP included in SIB1 (or if the cell is considered to support the NR-Lite UE through configuration information stored in SIB1), the UE camps-on the cell. Otherwise, the UE regards the cell as barred.

Referring to FIG. 6B, in step 6-40, when it is determined that acquisition of SIB1 by the UE is successful in step 6-25, the NR-Lite UE determines whether the reception of SIB1 has failed because the UE cannot support the configuration indicated by the subCarrierSpacingCommon field and the pdcch-ConfigSIB1 field.

In step 6-45, when the UE supports configuration indicated by the subCarrierSpacingCommon field and the pdcch-ConfigSIB1 field, but fails to receive SIB1, the UE regards the cell as barred. For example, this may occur when the reception signal is poor or a large interference signal is received and thus the reception of SIB1 has failed.

In step 6-50, the UE determines whether the intraFreqReselection field stored in the MIB is configured as Not Allowed.

In step 6-55, when the intraFreqReselection field is configured as Not Allowed, the UE may not consider, as a cell reselection candidate, other cells of the frequency to which the cell belongs.

In step 6-60, when the intraFreqReselection field is configured as allowed, the UE considers, as a cell reselection candidate, other cells of the frequency to which the cell belongs.

If the UE has failed to receive configuration indicated by the subCarrierSpacingCommon field and the pdcch-ConfigSIB1 field, and thus fails to receive SIB1, the UE regards the cell as barred in step 6-65. At this time, the cell may be considered as unable to support the NR-Lite UE.

In step 6-70, the UE determines whether a second indicator is configured for the MIB. If the second indicator indicates to consider cell reselection for other cells, the indication denotes that at least one cell belonging to the same frequency as that of the corresponding cell can support the NR-Lite UE.

In step 6-75, when the second indicator is configured, the UE considers other cells of the frequency to which the cell belongs as a cell reselection candidate.

In step 6-80, when the second indicator is not configured, the UE may not consider other cells of the frequency to which the cell belongs as a cell reselection candidate. That is, if the second indicator is not configured, this denotes that there is no other cell supporting NR-Lite at the frequency to which the cell belongs, and in this case, it is not necessary to consider the frequency to which the cell belongs in order to perform cell reselection.

FIG. 7 is a flowchart illustrating a UE process in which an NR-Lite UE determines a cell reselection frequency according to an embodiment.

Referring to FIG. 7, in step 7-05, a UE receives system information SIB3 and SIB4 from a base station. The system information SIB3 and SIB4 may be used to provide configuration information related to intra-frequency and inter-frequency cell reselection to UEs, respectively.

In step 7-10, the UE determines whether a new field NRLiteSupportingCellList for each frequency is stored in the system information. The NRLiteSupportingCellList field is a cell list and may be used to store IDs of cells, for each frequency, that should be measured by NR-Lite UEs. In addition, the system information may include a fourth indicator indicating, for each frequency, whether to perform an intra-frequency or inter-frequency measurement operation for cell reselection. The fourth indicator may indicate, for a specific frequency, whether or not the UE performs an intra-frequency or inter-frequency measurement operation for cell reselection. The fourth indicator may be configured by a multi-bit to indicate whether to perform measurement operations for respective frequencies, or may be configured to include a plurality of 1-bit indicators corresponding to respective frequencies.

In step 7-15, when the new field NRLiteSupportingCellList is configured in the system information, the UE performs, for each frequency, an intra-frequency or inter-frequency measurement operation for cell reselection on cells indicated in the field. In addition, only cells belonging to the list may be considered as candidates for cell reselection. If the system information includes a fourth indicator, the UE may or may not perform an intra-frequency or inter-frequency measurement operation for cell reselection at a specific frequency according to whether the fourth indicator performs indication.

In step 7-20, when the new field is not configured in the system information, the UE determines, for each frequency, whether the UE has ever achieved successful camping-on and received a service at the corresponding frequency. If the UE has never previously identified, for any frequency, whether an NR-Lite UE is supported, the UE may perform measurement on all valid frequencies.

In step 7-25, when the NR-Lite UE has been successfully camped-on a specific frequency before and received a service, an intra-frequency or inter-frequency measurement operation for cell reselection is performed for the corresponding frequency.

In step 7-30, when the NR-Lite UE has not been successfully camped-on a specific frequency before and/or did not receive a service, an intra-frequency or inter-frequency measurement operation for cell reselection may not be performed for the corresponding frequency.

Figure 8:
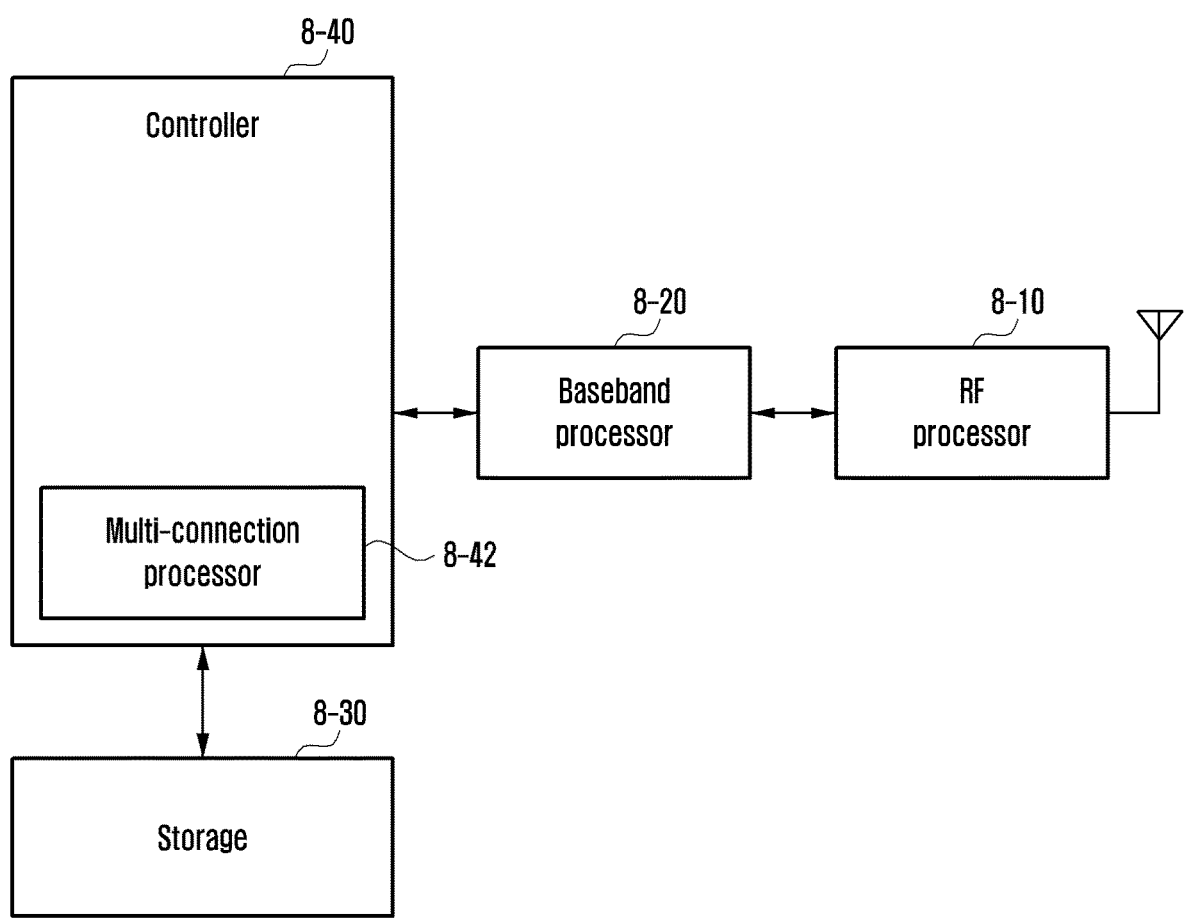
FIG. 8 illustrates a UE according to an embodiment.

FIG. 8 illustrates a UE according to an embodiment.

Referring to FIG. 8, the UE includes an RF processor 8-10, a baseband processor 8-20, a storage 8-30, and a controller 8-40.

The RF processor 8-10 performs a signal transmission or reception function, such as band conversion and amplification of the signal, through a radio channel. That is, the RF processor 8-10 up-converts a baseband signal provided from the baseband processor 8-20 into an RF band signal and transmits the RF band signal through an antenna, and down-converts the RF band signal, received through the antenna, into a baseband signal. For example, the RF processor 8-10 may include a transmission filter, a reception filter, an amplifier, a mixer, an oscillator, a digital-to-analog convertor (DAC), an analog-to-digital convertor (ADC), etc. In FIG. 8, although only one antenna is illustrated, the UE may include a plurality of antennas. Further, the RF processor 8-10 may include a plurality of RF chains and may perform beamforming. For the beamforming, the RF processor 8-10 may adjust the phase and magnitude of each of the signals transmitted or received through a plurality of antennas or antenna elements. In addition, the RE processor may perform a MIMO operation, and may receive multiple layers at the time of performing the MIMO operation.

The baseband processor 8-20 performs a function of conversion between a baseband signal and a bit string according to the physical layer standard of a system. For example, at the time of data transmission, the baseband processor 8-20 generates complex symbols by encoding and modulating a transmission bit stream. In addition, at the time of data reception, the baseband processor 8-20 reconstructs a reception bit string by demodulating and decoding the baseband signal provided from the RF processor 8-10. For example, according to an OFDM scheme, at the time of data transmission, the baseband processor 8-20 generates complex symbols by encoding and modulating a transmission bit stream, maps the complex symbols onto sub-carriers, and then configures OMNI symbols by performing an inverse fast Fourier transform (IFFT) operation and insertion of a cyclic prefix (CP). At the time of data reception, the baseband processor 8-20 divides the baseband signal provided from the RF processor 8-10 in units of OFDM symbols, reconstructs the signals, which have been mapped onto the sub-carriers, through a fast Fourier transform (FFT) operation, and then reconstructs the reception bit string by demodulating and decoding the mapped signals.

The baseband processor 8-20 and the RF processor 8-10 transmit or receive a signal as described above. Accordingly, each of the baseband processor 8-20 and the RF processor 8-10 may be referred to as a transmitter, a receiver, a transceiver, or a communication unit. Further, at least one of the baseband processor 8-20 and the RE processor 8-10 may include a plurality of communication modules in order to support different RATS. At least one of the baseband processor 8-20 and the RF processor 8-10 may include different communication modules in order to process signals in different frequency bands. For example, the different RATS may include a wireless local area network (LAN) (e.g., Institute of Electrical and Electronics Engineers (IEEE) 802.11), a cellular network (e.g., LTE), etc. The different frequency bands may include a super high frequency (SHE) (e.g., 2.NRHz, NRHz) band, and a millimeter wave e.g., 60 GHz) band.

The storage 8-30 stores data, such as a basic program, an application, and configuration information for performing the UE operation. The storage 8-30 may store information related to a second access node for performing wireless communication using a second RAT. The storage 8-30 provides stored data at the request of the controller 8-40.

The controller 8-40 controls the overall operation of the UE. For example, the controller 8-40 transmits or receives a signal through the baseband processor 8-20 and the RF processor 8-10, The controller 8-40 records or reads data in or from the storage 8-30. The controller 8-40 may include at least one processor. The controller 8-40 includes a multi-connection processor 8-42 for performing control for communication and an application processor (AP) for controlling a higher layer such as an application.

Figure 9:
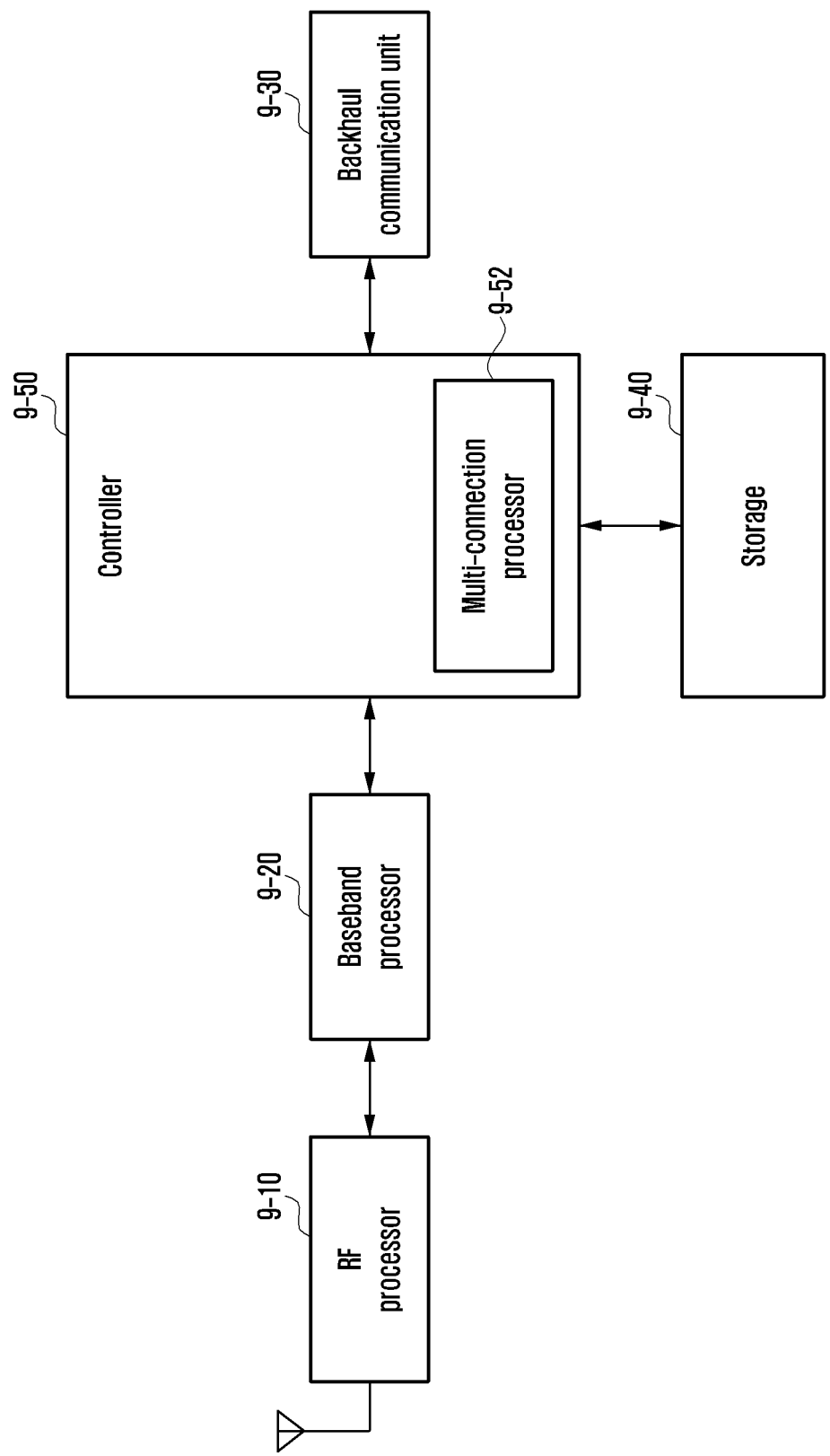
FIG. 9 illustrates a base station according to an embodiment.

FIG. 9 illustrates a base station according to an embodiment.

Referring to FIG. 9, the base station includes an RF processor 9-10, a baseband processor 9-20, a backhaul communication unit 9-30, a storage 9-40, and a controller 9-50.

The RF processor 9-10 performs a function for transmitting or receiving a signal, such as band conversion and amplification of the signal, through a radio channel. The RF processor 9-10 up-converts a baseband signal provided from the baseband processor 9-20 into an RF band signal and transmits the RF band signal through an antenna, and down-converts the RF band signal, received through the antenna, into a baseband signal. The RF processor 9-10 may include a transmission filter, a reception filter, an amplifier, a mixer, an oscillator, a DAC, an ADC, etc. In FIG. 7, although only one antenna is shown, the base station may include a plurality of antennas and the RF processor 9-10 may include a plurality of RF chains. The RF processor 9-10 may perform beamforming. For the beamforming, the RF processor 9-10 may adjust the phase and magnitude of each of the signals transmitted or received through a plurality of antennas or antenna elements. In addition, the RF processor may perform a downlink MIMO operation by transmitting one or more layers.

The baseband processor 9-20 performs a function of conversion between a baseband signal and a bit string according to the physical layer standard of a first RAT. For example, at the time of data transmission, the baseband processor 9-20 generates complex symbols by encoding and modulating a transmission bit stream. At the time of data reception, the baseband processor 9-20 reconstructs a reception bit string by demodulating and decoding the baseband signal provided from the RF processor 9-10, For example, according to an OFDM scheme, at the time of data transmission, the baseband processor 9-20 generates complex symbols by encoding and modulating a transmission bit stream, maps the complex symbols onto sub-carriers, and then configures OFDM symbols by performing an IFFT operation and CP insertion. At the time of data reception, the baseband processor 9-20 divides the baseband signal provided from the RF processor 9-10 in units of OFDM symbols, reconstructs the signals, which have been mapped onto the sub-carriers, through an ITT operation, and then reconstructs the reception bit string by demodulating and decoding the mapped signals. The baseband processor 9-20 and the RF processor 9-10 transmit or receive a signal as described above. Accordingly, each of the baseband processor 9-20 and the RF processor 9-10 may be referred to as a transmitter, a receiver, a transceiver, a communication unit, or wireless communication unit.

The backhaul communication unit 9-30 provides an interface for communication with other nodes in a network. That is, the backhaul communication unit 9-30 converts a bit string, transmitted from a main base station to another node, for example, an auxiliary base station, a core network, etc., into a physical signal, and converts the physical signal, received from the another node, into a bit string.

The storage 9-40 stores data, such as a basic program, an application, and configuration information for performing the operation of a main base station. The storage 9-40 may store information on a bearer allocated to the connected UE, a measurement result reported by the connected UE, etc. The storage 9-40 may store information serving as a criterion for determining whether to provide or terminate multiple connections to the UE. In addition, the storage 9-40 provides stored data at the request of the controller 9-50.

The controller 9-50 controls the overall operation of the base station. For example, the controller 9-50 transmits or receives a signal through the baseband processor 9-20 and the RF processor 9-10, or through the backhaul communication unit 9-30. In addition, the controller 9-50 records or reads data in or from the storage 9-40, To this end, the controller 9-50 includes a multi-connection processor 9-52.

Figure 10:
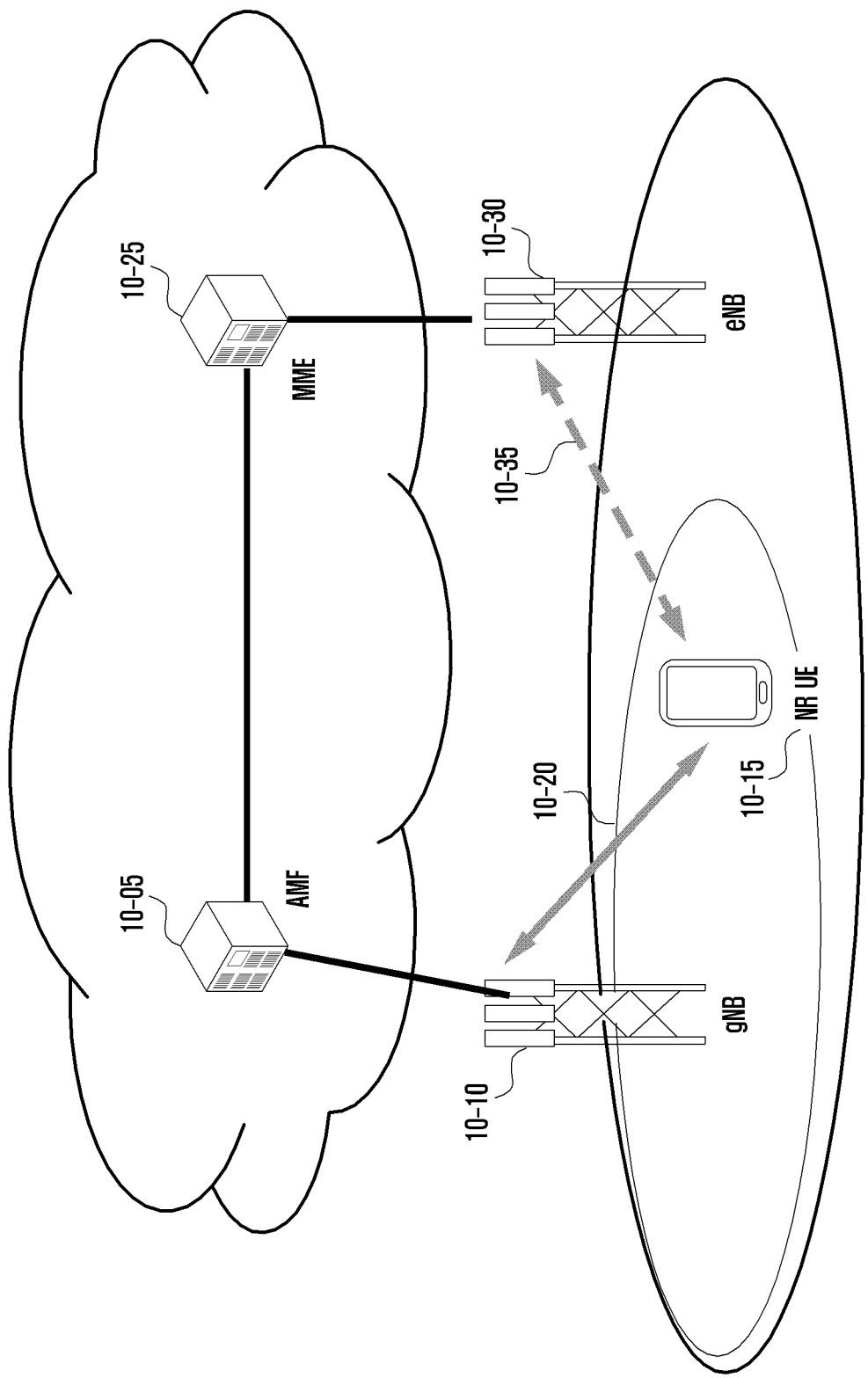
FIG. 10 illustrates a next-generation mobile communication system according to an embodiment.

FIG. 10 illustrates the structure of a next-generation mobile communication system according to an embodiment.

Referring to FIG. 10, a radio access network of a next-generation mobile communication system (e.g., NR) includes a next-generation base station (new radio node B, hereinafter referred to as a gNB) 10-10 and an AMF (a new radio core network) 10-05. A user equipment (new radio user equipment, hereinafter referred to as an NR UE or a UE) 10-15 is connected to an external network through the gNB 10-10 and the AMF 10-05.

In FIG. 10, the gNB may correspond to an evolved node B (eNB) of the existing LTE system. The gNB is connected to the NR UE through a radio channel and can provide superior service than that of an existing node B (indicated by reference numeral 10-20). In the next-generation mobile communication system, since all user traffic are serviced through a shared channel, a device for collecting and scheduling state information, such as buffer states, available transmission power states, channel states of UEs are required, and gNB 10-10 is used to perform such a function of the device. In general, one gNB usually controls multiple cells.

In order to implement ultra-high-speed data transmission compared to the existing LTE, the NR system may include a bandwidth that is greater than or equal to the existing maximum bandwidth, use OFDM as a RAT, and combine additional beamforming technology. In addition, the NR system adopts an AMC scheme for determining a modulation scheme and a channel coding rate according to the state of a channel used by a terminal. The AMF 10-05 performs functions such as mobility support, bearer setup, and QoS setup. The AMF is a device that is responsible for various control functions as well as mobility management functions for. UEs, and is connected to multiple base stations. In addition, the next-generation mobile communication system may be linked with the existing LTE system, and the AMF is connected to the MME 10-25 through a network interface. The MME is connected to an eNB 10-30, which is an existing base station. A UE supporting LTE-NR dual connectivity may transmit or receive data while maintaining a connection to the eNB as well as the gNB (as indicated by reference numeral 10-35).

Figure 11:
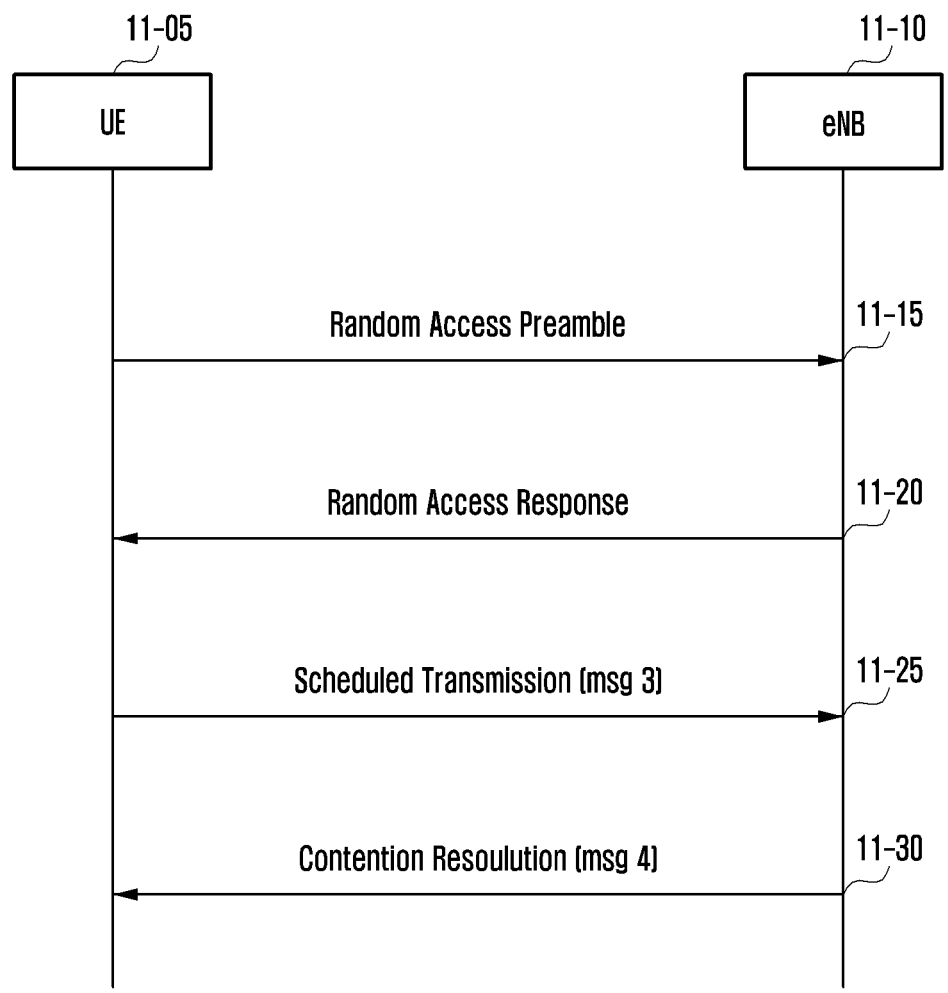
FIG. 11 illustrates a random access process according to an embodiment.

FIG. 11 illustrates a random access process according to an embodiment.

Referring to FIG. 11, random access may be performed if uplink synchronization is performed or data is transmitted to a network. More specifically, random access may be performed when switching from an idle mode to a connected mode, performing RRC re-establishment, performing a handover, or starting uplink/downlink data transmission. If a UE 11-05 receives a dedicated preamble from a base station 11-10, the UE 11-05 may apply the received preamble and transmit the preamble. Otherwise, the UE selects one of two preamble groups and selects a preamble belonging to the selected group. The preamble groups may include group A and group B. The UE may select a preamble belonging to group B if the channel quality state is better than a specific threshold value and the size of Msg3 is greater than a specific threshold value. Otherwise, the UE may select a preamble belonging to group A. If the UE transmits the preamble described above in the nth subframe in step 11-15, the UE may start an RAR window at the (n+3)th subframe and monitor whether a RAR is transmitted within the time period of the window in step 11-20. Scheduling information of the RAR is indicated by a random access (RA)-radio network temporary identifier (RNTI) of a PDCCH. The RA-RNTI is derived using the location of a radio resource on the time and frequency axes used for transmission of the preamble. The RAR may include a timing advance command, a UL grant, and a temporary C-RNTI. When the RAR is successfully received in the RAR window, the UE may transmit Msg3 using the UL grant included in the RAR in step 11-25. Msg3 includes different pieces of information depending on the purpose of random access.

Table 1 below shows an example of information included in msg3.

TABLE 1

| CASE | Message 3 Contents |
| --- | --- |
| RRC CONNECTION SETUP | Common control channel (CCCH) sendee data unit (SDU) |
| RRC RE-ESTABLISHMENT | CCCH SDU, buffer status report (BSR) (if grant is enough), power headroom report (PHR) (if triggered & grant is enough) |
| Handover (random preamble) | Cell (C)-RNTI control element (CE), BSR, PHR, (part of) dedicated control channel (DCCH) SDU |
| Handover (dedicated preamble) | BSR, PHR, (part of) DCCH SDU |
| UL resume | C-RNTI CE, BSR, PHR, (part of) DCCH/dedicated traffic channel (DTCH) SDU |
| PDCCH order (random preamble) | C-RNTI CE, BSR, PHR, (part of) DCCH/DTCH SDU |
| PDCCH order (dedicated preamble) | BSR, PHR, (part of) DCCH/DTCH SDU |

If the UE has received the RAR in the nth subframe, Msg3 may be transmitted in the (n+6)th subframe. From Msg3, an HARQ may be applied. After transmission of Msg3, the UE may start a specific timer and monitor a contention resolution (CR) message until the timer expires in step 11-30. In an embodiment, the CR message may include an RRC connection setup or RRC connection reestablishment message depending on the purpose of random access in addition to a CR MAC CE.

Figure 12:
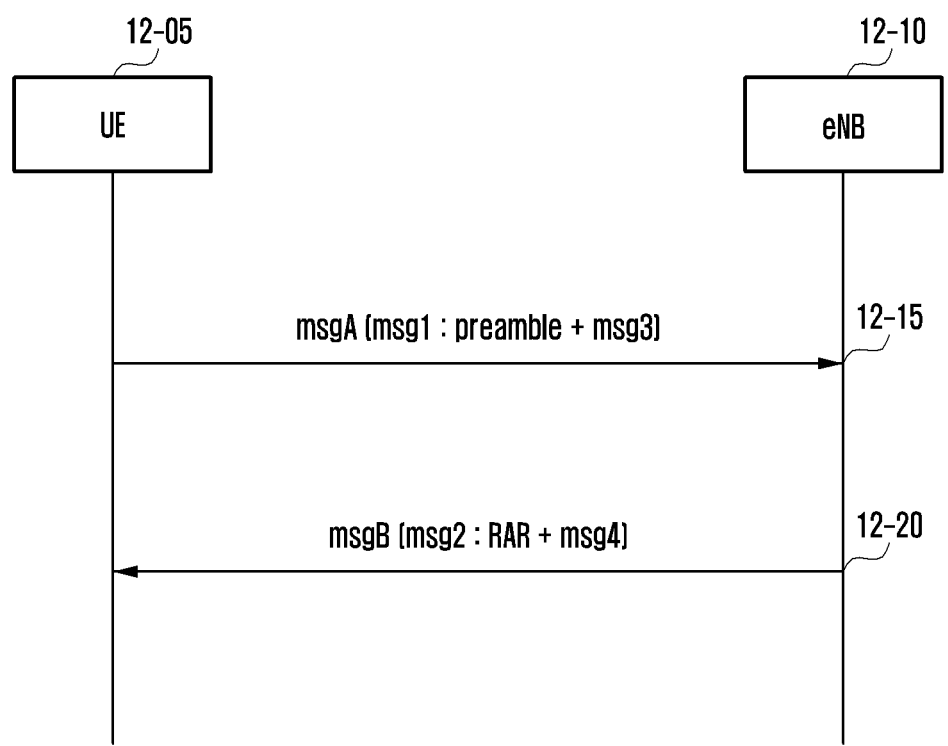
FIG. 12 illustrates a two-step random access process according to an embodiment.

FIG. 12 illustrates a two-step random access process according to an embodiment.

Referring to FIG. 12, msgA 12-15, which is transmitted by a UE 12-05 to a base station 12-10 in the uplink, and msgB 12-20, which is transmitted by the base station 12-10 to the UE 12-05 in the downlink are configured. Conceptually, the msgA may include contents of msg1 (i.e., a preamble) and msg3 and scheduling information of msgB in a conventional random access process. In addition, the msgB may include contents of msg2 (i.e., an RAR) and msg4 in a conventional random access process. For example, the information stored in the conventional msg 3 is listed in Table 1 described above. Depending on the purpose of random access, information stored in msg3 may be different. Similarly, information stored in the msgA may also be different depending on the purpose of the two-step random access. Information stored in the conventional msg2 may include a random access preamble identifier (RAPID), a timing advance (TA) command, UL grant, and a temporary C-RNTI.

According to an embodiment, if the two-step random access process is considered as failed according to a predetermined condition, the random access process may be switched to the four-step random access process as illustrated in FIG. 11, For example, the predetermined condition refers to when the signal strength (e.g., RSRP) of a reference signal transmitted by a base station does not satisfy a predetermined RSRP threshold or when a message (e.g., a fallbackRAR) indicating to switch to the four-step random access is received from a network. The predetermined RSRP threshold value may be provided to the UE through system information broadcasted by the network. System information may be stored in an MIB or SIB 1, which is periodically broadcasted.

Although details of the disclosure are described based on the LTE system, the technology of the disclosure is also applicable to the NR system. For example, the eNB may correspond to the gNB and the MME may correspond to the AMF.

Figure 13:
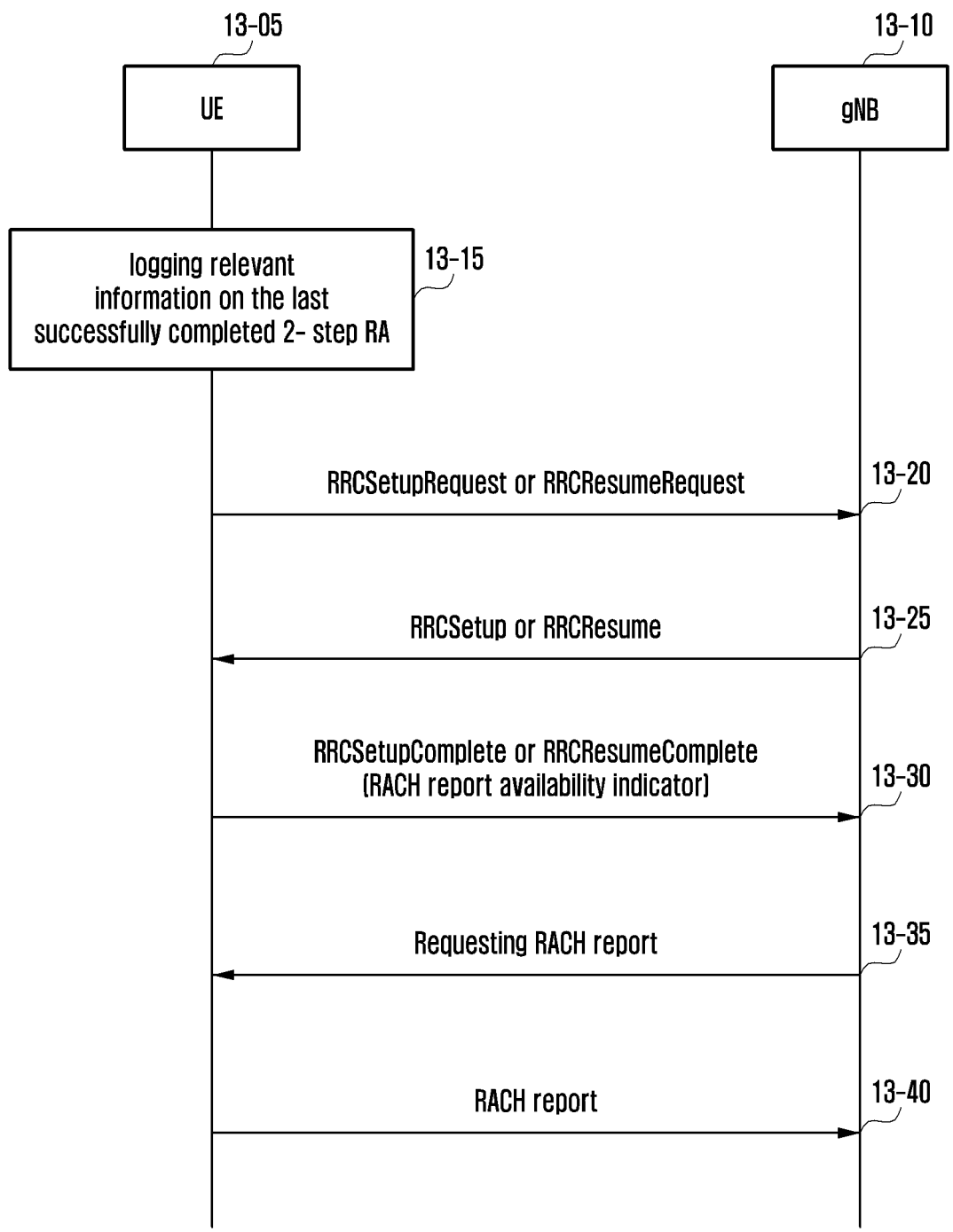
FIG. 13 illustrates a process of performing a random access channel (RACH) report according to an embodiment.

FIG. 13 illustrates a process of performing a RACH report according to an embodiment.

Referring to FIG. 13, A UE 13-05 performs a process of random access to a base station 13-10. In step 13-15, the UE 13-05 may store predetermined information related to the most recent successful random access process. Thereafter, if another random access process is performed and is successfully completed, the UE may delete previously stored information and store predetermined information related to a new random access process. In the disclosure, without being limited to the most recent successful random access process, all of the recent random access processes that have been performed for a predetermined time or the recent N random access processes may be considered. Alternatively, all recent random access processes may be considered in a range not exceeding the capacity of a predetermined UE memory. In addition, the UE may store information related to a failed random access process in addition to a successful random access process. If the random access process is related to the two-step random access, in addition to information of numberOfPreamblesSent (the number of times the RACH preamble is transmitted) and contentionDetected (indicating whether even one contention has occurred among the transmitted preambles) stored in the conventional RACH report, the UE may additionally store predetermined pieces of information, such as:

An indicator indicating that (the most recently successful) random access process is a two-step random access process;

An indicator indicating whether the two-step random access process is switched to the four-step random access process in (the most recently successful) random access process;

The number of times the two-step random access process is switched to the four-step random access process in (the most recently successful) random access process;

The number of times the two-step random access process is switched to the four-step random access process is determined based on the RSRP value, in (the most recently successful) random access process;

The RSRP threshold value and the measured RSRP value, which are considered and applied respectively when the two-step random access process is switched to the four-step random access process in (the most recently successful) random access process;

The number of times of reception of a fallbackRAR message indicating switching from the two-step random access process to the four-step random access process in (the most recently successful) random access process;

Size information of the msgA message which has been transmitted through the uplink in the two-step random access process;

Downlink synchronization signal block (SSB) index information when RAR and msg4 are received during the random access process;

ID information of a cell that has attempted the random access process (physical a cell ID (PCI) or a cell global identity (CGI)); and The type of uplink, which has attempted the random access process, that is, normal uplink (NUL) or SUL.

In step 13-20, the UE 13-05, which is in an idle mode or inactive mode, transmits an RRCSetupRequest or RRCResumeRequest message to a base station 13-10 in order to switch to a connected mode.

In step 13-25, the base station 13-10 transmits an RRCSetup or RRCResume message to the UE 13-05, and the UE 13-05 which has received the RRCSetup or RRCResume message may be switched to a connected mode.

In step 13-30, if the UE 13-05 includes stored random access-related information, the UE 13-05 may transmit, to a base station 13-10, an RRCSetupComplete or RRCResumeComplete message including an availability indicator indicating the random access-related information.

In step 13-20, the base station 13-10 which has received the indicator requests the UE 13-05 to report information by using an RRC message.

Upon receiving the request, the UE 13-05 transmits a predetermined response RRC message including the stored information to the base station 13-10 in step 13-40. At this time, the storage information reported to the base station 13-10 may be deleted, FIG. 14 illustrates a process of performing an RLF report according to an embodiment.

Figure 14:
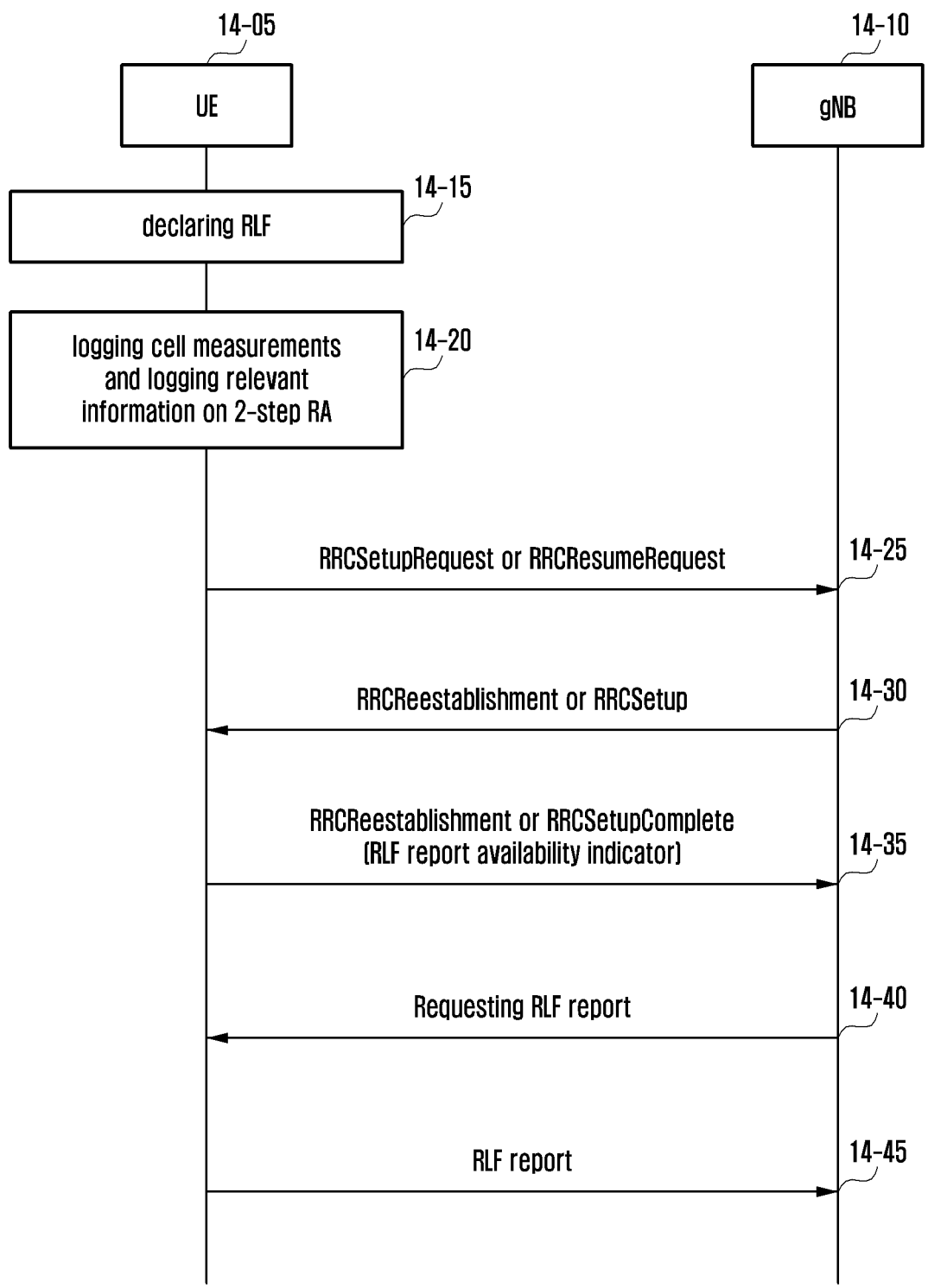
FIG. 14 illustrates a process of performing a radio link failure (RLF) report according to an embodiment.

Referring to FIG. 14, a UE 14-05 in a connected mode may perform a process of random access to a base station 14-10. For example, the UE 14-05 may perform a process of random access to a target cell in order to move to the target cell through a handover operation. If the random access process is regarded as a failure, the handover process may also be considered as a failure, and thus an RLF may be declared in step 14-15.

In step 14-20, the UE 14-05 stores valid information if an RLF occurs. The UE 14-05 also stores predetermined information related to a random access process that has caused an RLF, in order to perform RLF reporting.

If the random access process has been performed several times before the RLF is declared, the UE may delete the previously stored information and store predetermined information related to the new random access process. The disclosure is not limited to one random access process, which is the most recently performed, and all of the recent random access processes that have been performed for a predetermined time or the recent N random access processes may be considered. Alternatively, all recent random access processes may be considered in a range not exceeding a predetermined UE memory.

In an embodiment, two-step random access may have been performed in the random access process, and in this case, the UE may also store information related thereto. For example, the UE may store predetermined pieces of information as follows:

The number of times the RACH preamble has been transmitted during the random access process;

An indication indicating whether even one contention has occurred among the transmitted preambles during the random access process;

An indicator indicating that (the most recently) performed random access process is a two-step random access process;

An indicator indicating whether the two-step random access process is switched to the four-step random access process in (the most recently) performed random access process;

The number of times the two-step random access process is switched to the four-step random access process in (the most recently) performed random access process;

The number of times the two-step random access process is switched to the four-step random access process is determined based on the RSRP value, in (the most recently) performed random access process;

The RSRP threshold value and the measured RSRP value; which are considered and applied respectively when the two-step random access process is switched to the four-step random access process in (the most recently) performed random access process;

The number of times of reception of a fallbackRAR message indicating switching from the two-step random access process to the four-step random access process in (the most recently) performed random access process;

Size information of the msgA message which has been transmitted through the uplink in the two-step random access process;

Downlink SSB index information when an RAR and msg4 are received during the random access process;

ID information of a cell that has attempted the random access process (PCI or CGI); and The type of uplink, which has attempted the random access process; i.e., NUL or SUL.

The UE 14-05, which has declared the RLF, may find one suitable cell through a cell selection operation and perform a re-establishment operation with an appropriate cell. For example, in step 14-25, the UE 14-05 transmits an RRCReestablishmentRequest message to the cell. In step 14-30, the cell transmits an RRCReestablishment message to the UE 14-05, At this time, the UE 14-05 may consider the re-establishment operation to be successful.

In step 14-35, the UE 14-05 transmits an RRCReestablishmentComplete message including an availability indicator indicating that there is an REF report including stored random access-related information to the base station 14-10.

In step 14-40, the base station 14-10, which has received the indicator, requests the UE 14-05 to perform REF reporting using an RRC message.

Upon receiving the request, the UE 14-05 transmits a predetermined response RRC message including the stored RLF report to the base station 14-10 in step 14-45.

If the re-establishment process described above fails, the UE 14-05 may be switched to the idle mode. Thereafter, the UE 14-05 may transmit an RRCSetupRequest message to the base station 14-10 in order to switch to a connected mode in step 14-25. The base station 14-10 transmits an RRCSetup message to the UE 1.4-05 in step 14-30, and the UE 14-05 which has received the RRCSetup message may be switched to a connected mode. The UE 14-05 may transmit an RRCReestablishmentComplete message including an availability indicator indicating that there is an RLF report including stored random access-related information to the base station 14-10 in step 14-35. The base station 14-10 which has received the indicator may request the UE 14-05 to perform RLF reporting using an RRC message in step 14-40.

Upon receiving the request, the UE 14-05 may transmit a predetermined response RRC message including the stored RLF report to the base station 14-10 in step 14-45. Storage information reported to the base station 14-10 may be deleted.

Figure 15:
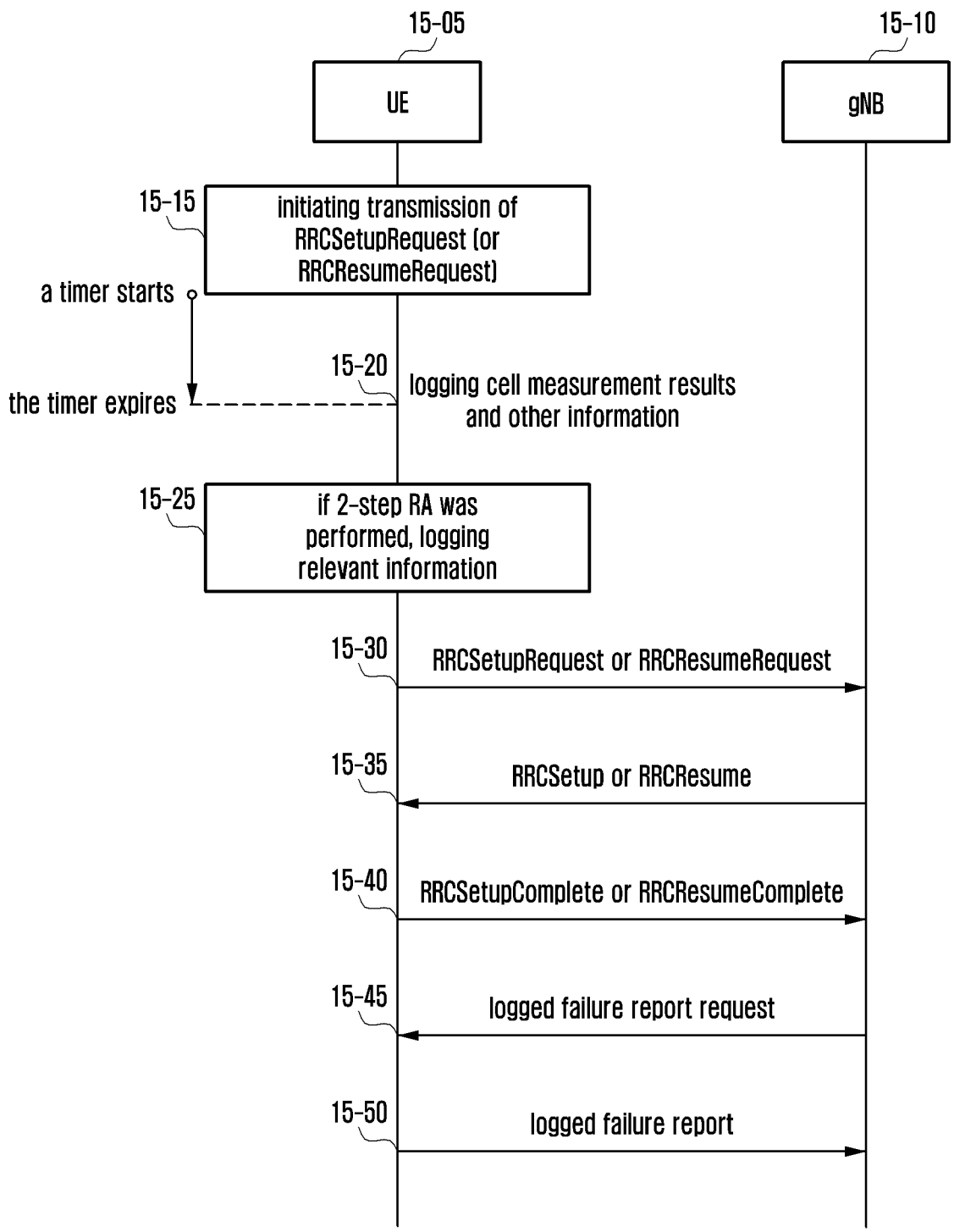
FIG. 15 illustrates a process of performing a connection failure report according to an embodiment.

FIG. 15 illustrates a process of performing a connection failure report according to an embodiment.

Referring to FIG. 15, a UE 15-05, which is in an idle mode or inactive mode, triggers transmission of an RRCSetupRequest or RRCResumeRequest message in order to switch to a connected mode in step 1545. At this time, the UE 15-05 may start a predetermined timer. In addition, the UE 15-05 may trigger a random access process for a serving base station 15-10. If reception of the RRCSetup or RRC Resume message from the base station 15-10 has failed before the timer expires, the UE 15-05 may consider that the triggered establishment process or resume process has failed.

In step 15-20, the UE 15-05 stores the collected cell measurement information and other additional information. If two-step random access is performed in the random access process, the UE 15-05 may also store information related thereto. In step 15-25, the UE 15-05 may store predetermined pieces of information as follows:

- The number of times the RACH preamble has been transmitted during the random access process;
- An indication indicating whether a contention has occurred among the transmitted preambles during the random access process;
- An indicator indicating that (the most recently) performed random access process is a two-step random access process;
- An indicator indicating whether the two-step random access process is switched to the four-step random access process in (the most recently) performed random access process;
- The number of times the two-step random access process is switched to the four-step random access process in (the most recently) performed random access process;
- The number of times the two-step random access process is switched to the four-step random access process is determined based on the RSRP value, in (the most recently) performed random access process;
- The RSRP threshold value and the measured RSRP value, which are considered and applied respectively when the two-step random access process is switched to the four-step random access process in (the most recently) performed random access process;
- The number of times of reception of a fallbackRAR message indicating switching from the two-step random access process to the four-step random access process in (the most recently) performed random access process;
- Size information of the msgA message which has been transmitted through the uplink in the two-step random access process;
- Downlink SSB index information when an RAR and msg4 are received during the random access process;
- ID information of a cell that has attempted the random access process (PCI or CGI); and
- The type of uplink, which has attempted the random access process, i.e., NUL or SUL.

After a predetermined time, the UE 15-05 may reattempt the establishment process or resume process for switching from the idle mode or the inactive mode to the connected mode. In step 15-30, the UE 15-05 transmits an RRCSetupRequest or RRCResumeRequest message to the base station 15-10 in order to switch to a connected mode.

In step 15-35, the base station 15-10 transmits an RRCSetup or RRCResume message to the UE 15-05, and the UE 15-05, which has received the RRCSetup or RRCResume message, may be switched to a connected mode.

In step 15-40, the UE 15-05 may include, in an RRCSetupComplete or RRCResumeComplete message, an indicator indicating whether there is Establishment/Resume failure information stored in the UE itself.

If necessary, in step 15-45, the base station 15-10 which has received the RRCSetupComplete or RRCResumeComplete message may request the UE 15-05 to report the establishment failure and resume failure information using an RRC message.

Upon receiving the request, the UE 15-05 reports establishment failure and resume failure information using an RRC message in step 15-50. At this time, the stored information reported to the base station 15-10 may be deleted.

Figure 16:
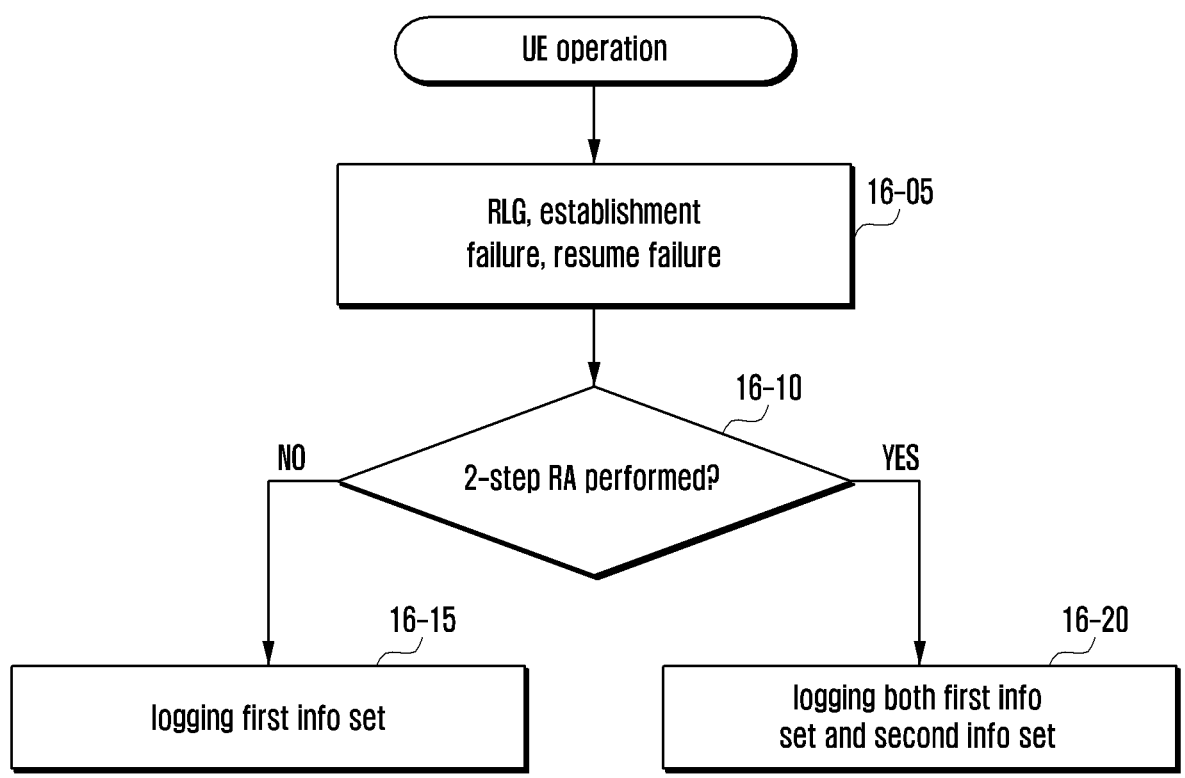
FIG. 16 is a flowchart illustrating an operation of a UE according to an embodiment.

FIG. 16 is a flowchart illustrating a UE operation according to an embodiment. For example, the UE operations illustrated in FIG. 16 may be performed by the UE 10-15 illustrated FIG. 10.

Referring to FIG. 16, in step 16-05, the UE recognizes that an RLF, an establishment failure, and a resume failure have occurred.

In step 16-10, the UE determines whether the two-step random access process has been performed among the random access processes performed before the failure described above (e.g., the RLF, the establishment failure, and the resume failure) occurs.

In step 16-15, the UE stores conventional information, if the two-step random access process has not been performed.

In step 16-20, if the two-step random access process is performed, the UE stores newly defined information proposed in the disclosure with the conventional information.

Figure 17:
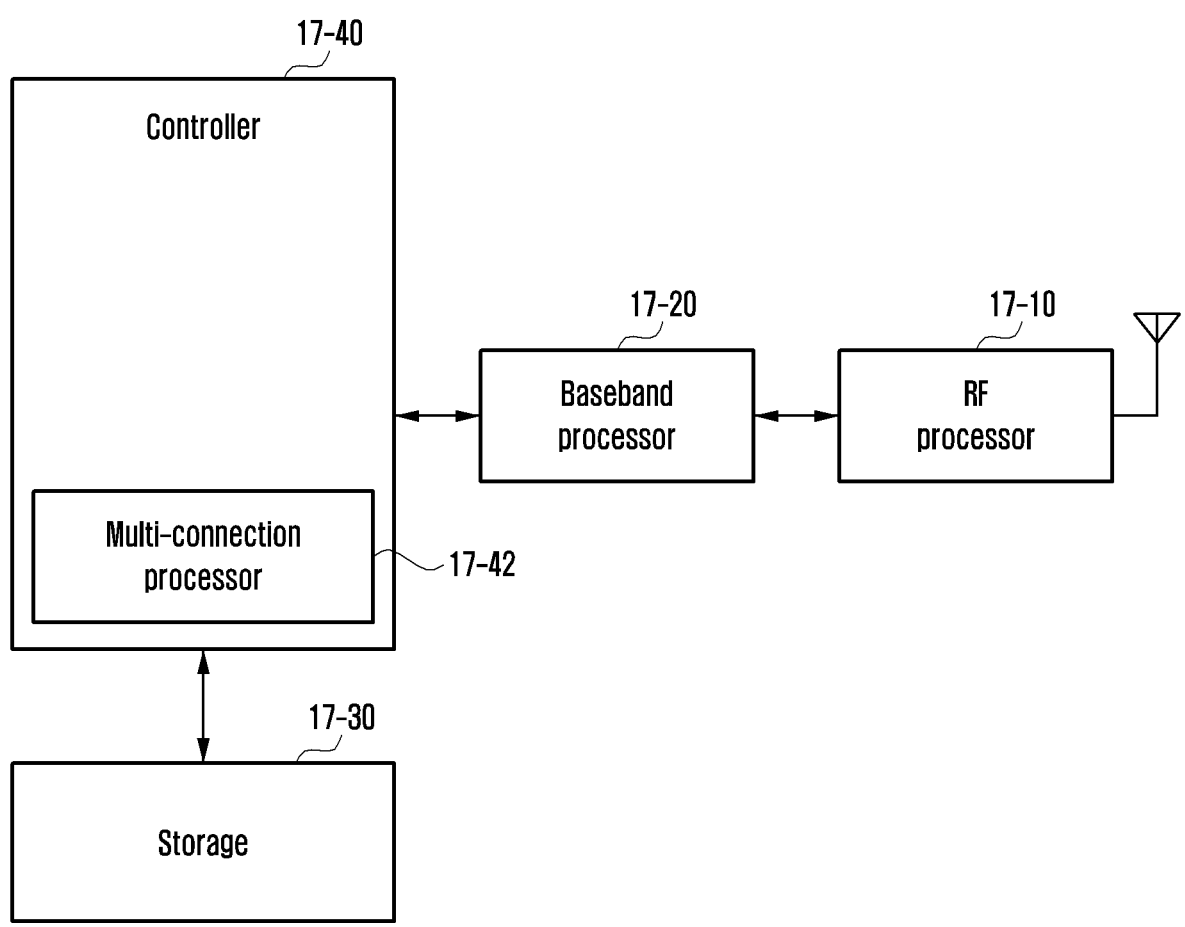
FIG. 17 illustrates a UE according to an embodiment.

FIG. 17 illustrates a UE according to an embodiment.

Referring to FIG. 17, the UE includes an RF processor 17-10, a baseband processor 17-20, a storage 17-30, and a controller 17-40.

The RF processor 17-10 performs a signal transmission or reception function, such as band conversion and amplification of the signal, through a radio channel. That is, the RF processor 17-10 up-converts a baseband signal provided from the baseband processor 17-20 into an RF band signal and transmits the RF band signal through an antenna, and down-converts the RF band signal, received through the antenna, into a baseband signal. For example, the RF processor 17-10 may include a transmission filter, a reception filter, an amplifier, a mixer, an oscillator, a DAC, an ADC, etc. In FIG. 17, although only one antenna is illustrated, the UE may include a plurality of antennas. Further, the RF processor 17-10 may include a plurality of RF chains and may perform beamforming. For the beamforming, the RF processor 17-10 may adjust the phase and magnitude of each of the signals transmitted or received through a plurality of antennas or antenna elements. In addition, the RF processor 17-10 may perform a MIMO operation, and may receive multiple layers at the time of performing the MIMO operation.

The baseband processor 17-20 performs a function of conversion between a baseband signal and a bit string according to the physical layer standard of a system. For example, at the time of data transmission, the baseband processor 17-20 generates complex symbols by encoding and modulating a transmission bit stream. In addition, at the time of data reception, the baseband processor 17-20 reconstructs a reception bit string by demodulating and decoding the baseband signal provided from the RF processor 17-10. For example, according to an OFDM scheme, at the time of data transmission, the baseband processor 17-20 generates complex symbols by encoding and modulating a transmission bit stream, maps the complex symbols onto sub-carriers, and then configures OFDM symbols by performing an IFFT operation and insertion of a CP. At the time of data reception, the baseband processor 17-20 divides the baseband signal provided from the RF processor 17-10 in units of OFDM symbols, reconstructs the signals, which have been mapped onto the sub-carriers, through an FFT operation, and then reconstructs the reception bit string by demodulating and decoding the mapped signals.

The baseband processor 17-20 and the RF processor 17-10 transmit or receive a signal as described above. Accordingly, each of the baseband processor 17-20 and the RF processor 17-10 may be referred to as a transmitter, a receiver, a transceiver, or a communication unit. Further, at least one of the baseband processor 17-20 and the RF processor 17-10 may include a plurality of communication modules in order to support different RATs. At least one of the baseband processor 17-20 and the RE processor 17-10 may include different communication modules in order to process signals in different frequency bands. For example, the different RATs may include a wireless LAN (e.g., IEEE 802.11), a cellular network (e.g., UE), etc. The different frequency bands may include an SHF (e.g., 2.NRHz, NRHz) band, and a millimeter wave (e.g., 60 GHz) band.

The storage 17-30 stores data, such as a basic program, an application, and configuration information for performing the UE operation. In particular, the storage 17-30 stores information related to a second access node for performing wireless communication using a second RAT. The storage 17-30 provides stored data at the request of the controller 17-40.

The controller 17-40 controls the overall operation of the UE. That is, the controller 17-40 may control other elements included in the UE to perform an operation for operating the UE. For example, the controller 17-40 transmits or receives a signal through the baseband processor 17-20 and the RF processor 17-10. The controller 17-40 records or reads data in or from the storage 17-30. The controller 17-40 may include at least one processor. For example, the controller 17-40 includes a multi-connection processor 17-42 for performing control for communication and an AP for controlling a higher layer such as an application.

Figure 18:
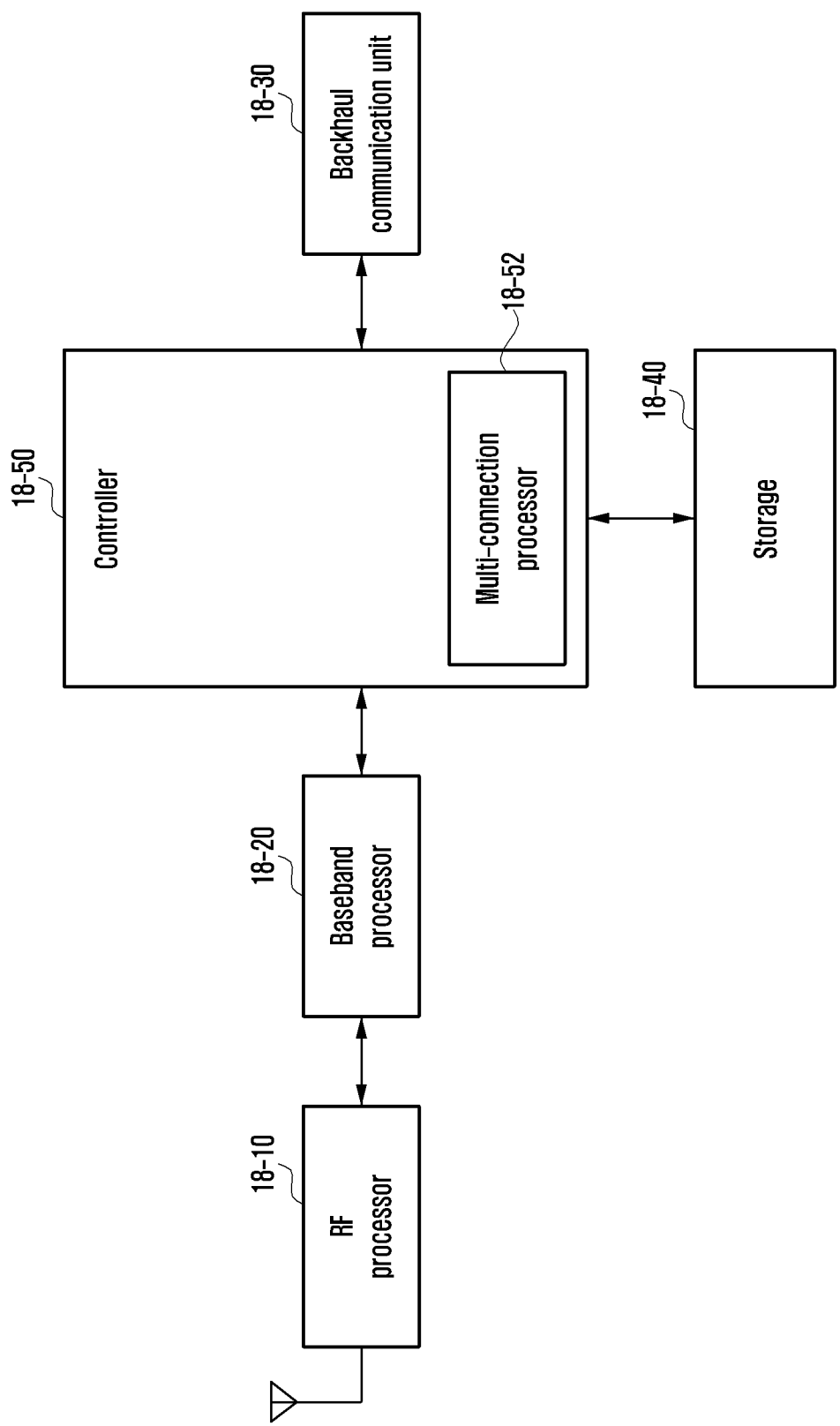
FIG. 18 illustrates a base station according to an embodiment.

FIG. 18 illustrates a base station according to an embodiment.

Referring to FIG. 18, the base station includes an RF processor 18-10, a baseband processor 18-20, a backhaul communication unit 18-30, a storage 18-40, and a controller 18-50.

The RF processor 18-10 performs a function for transmitting or receiving a signal, such as band conversion and amplification of the signal, through a radio channel. The RF processor 18-10 up-converts a baseband signal provided from the baseband processor 18-20 into an RF band signal and transmits the RE band signal through an antenna, and down-converts the RF band signal, received through the antenna, into a baseband signal. The RF processor 18-10 may include a transmission filter, a reception filter, an amplifier, a mixer, an oscillator, a DAC, an ADC, etc. In FIG. 18, although only one antenna is shown, the base station may include a plurality of antennas and the RF processor 18-10 may include a plurality of RF chains. The RF processor 18-10 may perform beamforming. For the beamforming, the RF processor 18-10 may adjust the phase and magnitude of each of the signals transmitted or received through a plurality of antennas or antenna elements. In addition, the RE processor 18-10 may perform a downlink MIMO operation by transmitting one or more layers.

The baseband processor 18-20 performs a function of conversion between a baseband signal and a bit string according to the physical layer standard of a first RAT. For example, at the time of data transmission, the baseband processor 18-20 generates complex symbols by encoding and modulating a transmission bit stream. At the time of data reception, the baseband processor 18-20 reconstructs a reception bit string by demodulating and decoding the baseband signal provided from the RE processor 18-10. For example, according to an OFDM scheme, at the time of data transmission, the baseband processor 18-20 generates complex symbols by encoding and modulating a transmission bit stream, maps the complex symbols onto sub-carriers, and then configures OFDM symbols by performing an IFFT operation and CP insertion. At the time of data reception, the baseband processor 18-20 divides the baseband signal provided from the RF processor 18-10 in units of OFDM symbols, reconstructs the signals, which have been mapped onto the sub-carriers, through an FFT operation, and then reconstructs the reception bit string by demodulating and decoding the mapped signals. The baseband processor 18-20 and the RF processor 18-10 transmit or receive a signal as described above. Accordingly, each of the baseband processor 18-20 and the RF processor 18-10 may be referred to as a transmitter, a receiver, a transceiver, a communication unit, or wireless communication unit.

The backhaul communication unit 18-30 provides an interface for communication with other nodes in a network. That is, the backhaul communication unit 18-30 converts a bit string, transmitted from a main base station to another node, for example, an auxiliary base station, a core network, etc., into a physical signal, and converts the physical signal, received from the another node, into a bit string.

The storage 18-40 stores data, such as a basic program, an application, and configuration information for performing the operation of a main base station. The storage 18-40 may store information on a bearer allocated to the connected UE, a measurement result reported by the connected UE, etc. The storage 18-40 may store information serving as a criterion for determining whether to provide or terminate multiple connections to the UE. In addition, the storage 18-40 provides stored data at the request of the controller 18-50.

The controller 18-50 controls the overall operation of the base station. That is, the controller 18-50 may control other elements included in a base station to perform an operation for operating the base station. For example, the controller 18-50 transmits or receives a signal through the baseband processor 18-20 and the RF processor 18-10, or through the backhaul communication unit 18-30. In addition, the controller 18-50 records or reads data in or from the storage 18-40. To this end, the controller 18-50 includes a multi-connection processor 18-52.

Although descriptions herein are based on an LTE system, the disclosure may be applied to other mobile communication systems such as NR, which is a next-generation mobile communication system. For example, in the disclosure, eNB in LTE may correspond to gNB in NR, and MME in LTE may correspond to AMF in NR.

Figure 19:
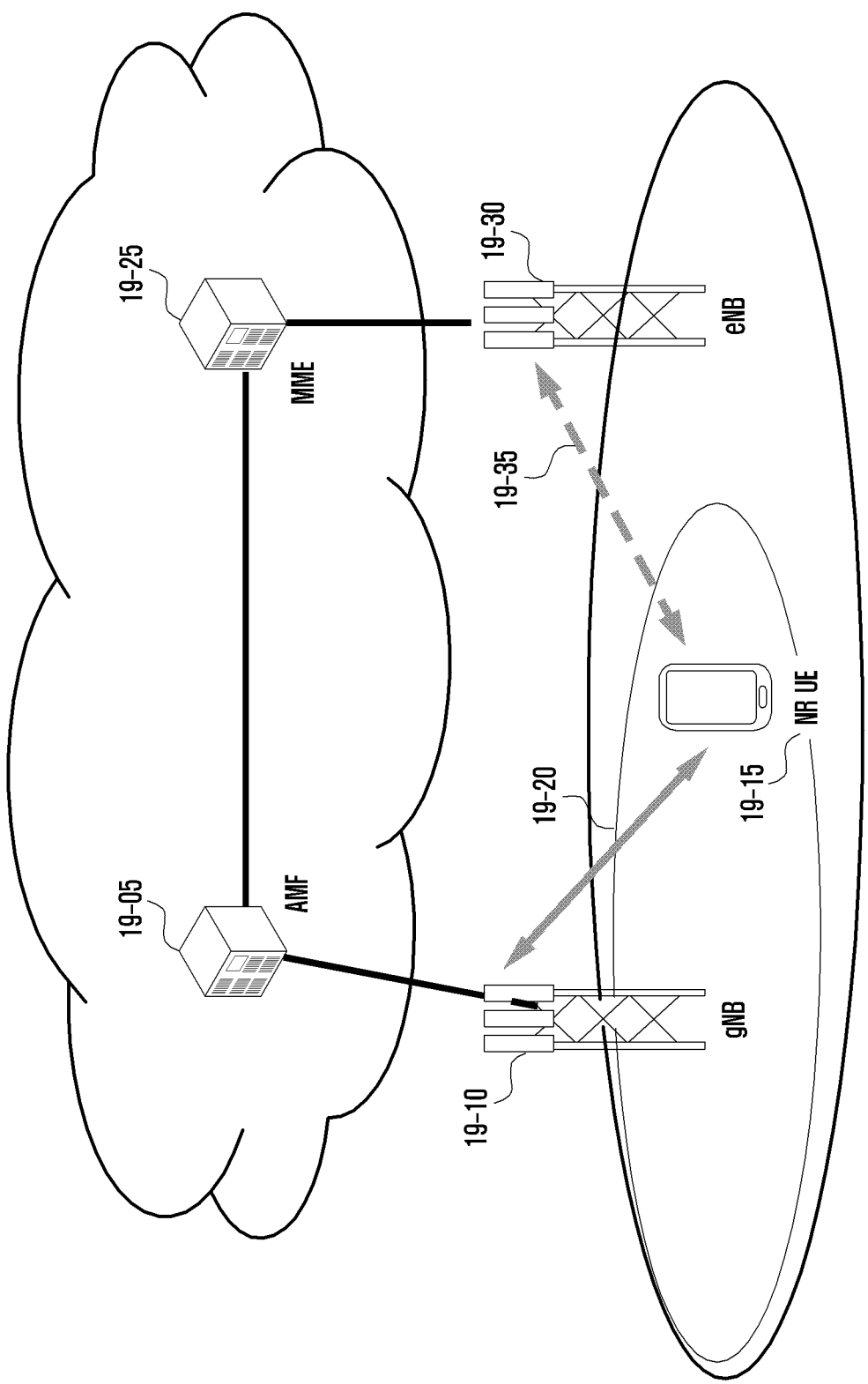
FIG. 19 illustrates a next-generation mobile communication system according to an embodiment.

FIG. 19 illustrates a next-generation mobile communication system according to an embodiment.

Referring to FIG. 19, a radio access network of a next-generation mobile communication system (e.g., NR) includes a next-generation base station (an NR node B or a gNB) 19-10 and an AMF (a new radio core network) 19-05. A UE (or an NR UE) 19-15 is connected to an external network through the gNB 19-10 and the AMF 19-05. According to an embodiment, an NR UE may be collectively referred to as a UE.

In FIG. 19, the gNB may correspond to an eNB of the existing LTE system. The gNB is connected to the NR UE through a radio channel and can provide better service than that of an existing node B (as indicated by reference numeral 19-20). In the next-generation mobile communication system, since all user traffic is serviced through a shared channel, a device for collecting and scheduling state information, such as buffer states, available transmission power states, and channel states of UEs is required, and gNB 19-10 is used to perform such a function of the device. In general, one gNB usually controls multiple cells.

In order to implement ultra-high-speed data transmission compared to the existing LTE, the NR system may include a bandwidth that is greater than or equal to the existing maximum bandwidth, use OFDM as a RAT, and combine additional beamforming technology. In addition, the NR system adopts AMC scheme for determining a modulation scheme and a channel coding rate according to the state of a channel used by a terminal. The AMF 19-05 performs functions such as mobility support, bearer setup, and QoS setup. The AMF is a device that is responsible for various control functions as well as mobility management functions for UEs, and is connected to multiple base stations. In addition, the next-generation mobile communication system may be linked with the existing LTE system, and the AMF is connected to the MME 19-25 through a network interface. The MME is connected to an eNB 19-30, which is an existing base station. A UE supporting LTE-NR dual connectivity may transmit or receive data while maintaining a connection to the eNB as well as the gNB (as indicated by reference numeral 19-35).

Figure 20:
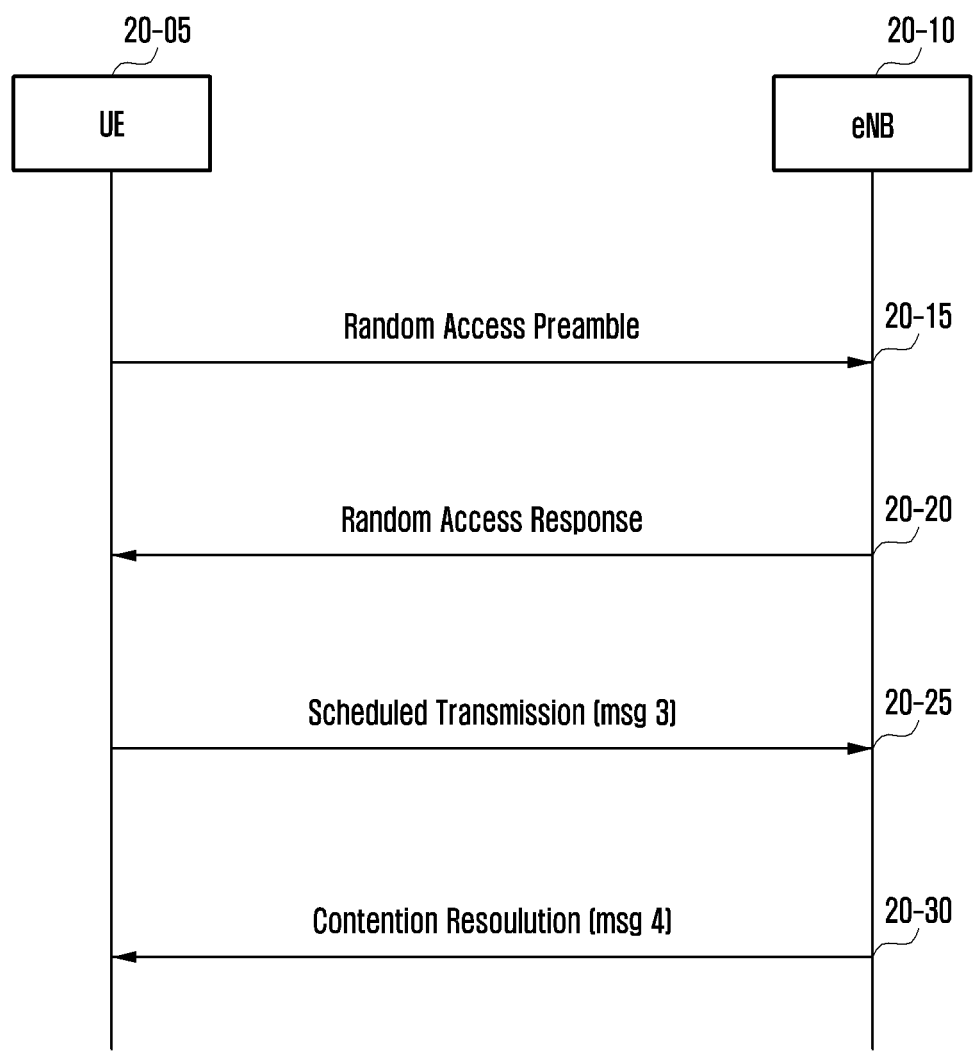
FIG. 20 illustrates a random access process according to an embodiment.

FIG. 20 illustrates a random access process according to an embodiment.

Referring to FIG. 20, random access may be performed if uplink synchronization is performed or data is transmitted to a network. More specifically, random access may be performed when switching from an idle mode to a connected mode, performing RRC re-establishment, performing a handover, or starting uplink/downlink data transmission. If a UE 20-05 receives a dedicated preamble from a base station 20-10, the UE 20-05 may apply the received preamble and transmit the preamble. Otherwise, the UE selects one of two preamble groups and selects a preamble belonging to the selected group. The preamble groups may include group A and group B. The UE may select a preamble belonging to group B if the channel quality state is better than a specific threshold value and the size of Msg3 is greater than a specific threshold value. Otherwise, the UE may select a preamble belonging to group A. If the UE transmits the preamble described above in the nth subframe in step 20-15, the UE may start an RAR window at the (n+3)th subframe and monitor whether a RAR is transmitted within the time period of the window in step 20-20. Scheduling information of the RAR is indicated by an RA-RNTI of a PDCCH. The RA-RNTI is derived using the location of a radio resource on the time and frequency axes used for transmission of the preamble. The RAR may include a timing advance command, a UL grant, and a temporary C-RNTI. When the RAR is successfully received in the RAR window, the UE may transmit Msg3 using the UL grant included in the RAR in step 20-25. Msg3 includes different pieces of information depending on the purpose of random access. <Table 2> below shows an example of information included in msg3.

TABLE 2

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicated preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicated preamble) | BSR, PHR, (part of) DCCH/DTCH SDU |

If the UE has received the RAR in the nth subframe, Msg3 may be transmitted in the (n+6)th subframe. From Msg3, an HARQ may be applied. After transmission of Msg3, the UE may start a specific timer and monitor a CR message until the timer expires in step 20-30. According to an embodiment, the CR message may include an RRC connection setup or RRC connection reestablishment message depending on the purpose of random access in addition to a CR MAC CE.

Figure 21:
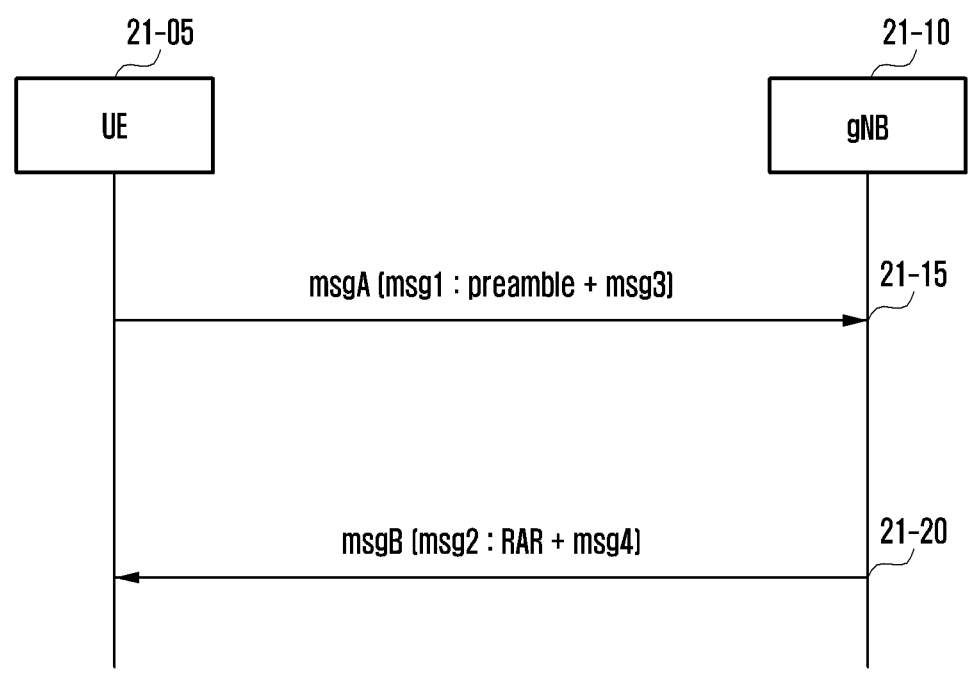
FIG. 21 illustrates a two-step random access process according to an embodiment.

FIG. 21 illustrates a two-step random access process according to an embodiment.

Referring to FIG. 21, msgA 21-15, which is transmitted by a. UE 21-05 to a base station 21-10 in the uplink, and msgB 21-20, which is transmitted by the base station 21-10 to the UE 21-05 in the downlink are configured. Conceptually, the msgA may include contents of msg1 (i.e., a preamble) and msg3 and scheduling information of msgB in a conventional random access process. In addition, the msgB may include contents of msg2 (i.e., an RAR) and msg4 in a conventional random access process. For example, the information stored in the conventional msg 3 is listed in Table 1 described above. Depending on the purpose of random access, information stored in msg3 may be different. Similarly, information stored in the msgA may also be different depending on the purpose of the two-step random access, Information stored in the conventional msg2 may include an RAPID, a TA command, UL grant, and a temporary C-RNTI.

Figure 22:
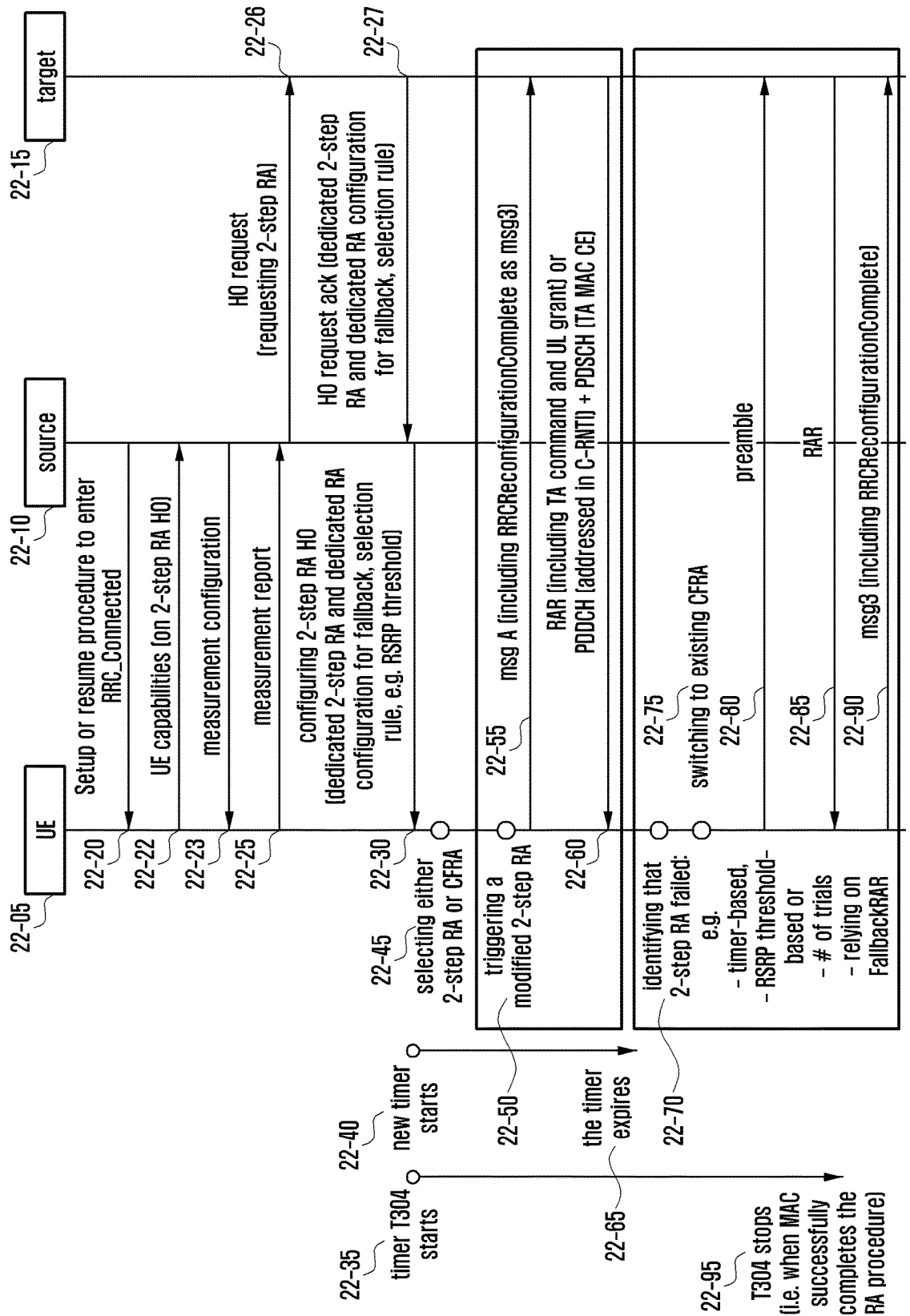
FIG. 22 illustrates a process of performing a handover using two-step random access according to an embodiment.

FIG. 22 illustrates a process of performing a handover using two-step random access according to an embodiment.

Referring to FIG. 22, a UE 22-05, which is in an idle mode or in an inactive mode, switches to a connected mode through an establishment process or a resume process in step 22-20.

In step 22-22, the UE 22-05 reports its own capability information to a source cell 22-10. The capability information may include an indicator indicating whether the UE 22-05 supports two-step random access.

In step 22-23, the source cell 22-10 provides cell measurement configuration information to the UE 22-05.

In step 22-25, the UE 22-05 reports the result of measurement according to the configuration information to the source cell 22-10.

The source cell 22-10 determines whether to perform a handover to a specific neighboring cell based on the result of cell measurement. In step 22-26, the source cell 22-10 requests a handover for the UE 22-05 from a target cell 2245 using a predetermined inter-node message (HandoverPreparationInformation). The inter-node message may include UE capability information, configuration information applied in the source cell 22-10, RAN context information required for the target cell 22-15, etc.

In addition, a handover based on two-step random access based on the result of cell measurement may be requested from the target cell. To this end, an inter-node message for the request may include an indicator requesting two-step random access. The indicator may include a field of the type of ENUMERATED. For example, if the measured signal strength of the target cell 22-15 has a value greater than or equal to a specific threshold value, that is, if the measured signal strength of the target cell is good, a handover based on two-step random access may be requested.

In step 22-27, the target cell 22-15 transmits a response message to the handover request to the source cell 22-10. The response message may include configuration information for performing a handover. The configuration information may also include random access configuration information for performing random access to the target cell 22-15. For example, the random access configuration information may include:

ra-Preambleindex: A preamble index used in random access to a target cell;

ssb: An SSB ID used in random access to a target cell;

occasions: Random access occasions used in random access to target cells;

ra-ssb-OccasionMaskIndex: A PRACH mask index for determining a random access radio resource for random access to a target cell; and ssb-perRACH-Occasion: The number of SSBs per RACH occasion.

According to an embodiment, the target cell 22-15 may provide contention-free random access (CFRA) configuration information and two-step random access configuration information in combination of options as follows:

Option 1: Provide only configuration information for two-step random access;

Option 2: Provide both contention-free-based random access configuration information and two-step random access configuration information;

Option 3: Provide only contention-free-based random access configuration information; and Option 4: Do not provide contention-free-based random access configuration information Options 3 and 4 are conventional techniques, and detailed descriptions thereof are omitted in the disclosure. For option 4, the UE 22-05 may perform contention-based RA (CBRA) to a target cell 22-15.

In step 22-30, the source cell 22-10, which has received the handover configuration information, includes the configuration information in an RRC message and forwards the RRC message to the UE 22-05. The UE 22-05, which has received the configuration information, may start first timers T304 and 22-35 and a second timer 22-40. The second timer may be used to switch to the conventional CFRA or CBRA from two-step random access. The length of the second timer may be configured to be shorter than or equal to the length of the first timer. The UE 22-05, which has received the handover configuration information, may trigger a handover operation for the target cell 22-15.

In step 22-45, the UE 22-05 determines a type of random access to be performed according to options and predetermined rules.

For option 1, the UE 22-05 may perform two-step random access or CBRA according to a predetermined rule. For example, a predetermined rule may denote:

Always perform two-step random access first; and if the measured RSRP value of the target cell is better than a specific configured or predefined RSRP threshold value, two-step random access is performed; otherwise, CBRA is performed.

For option 2, the UE 22-05 may perform two-step random access according to a predetermined rule or perform CFRA or CBRA, For example, a predetermined rule may denote:

Always perform two-step random access first;

Always perform CFRA first;

If the measured RSRP value of the target cell is better than a specific configured or predefined RSRP threshold value, two-step random access is performed, otherwise, CFRA is performed; or Determine whether CFRA can be performed, such as, whether the SSB of the target cell configured for a handover is suitable, and if it is determined to be difficult to perform the CFRA, perform two-step random access.

The target cell 22-15 may explicitly indicate that the UE 22-05 determines a random access process according to a predetermined rule. The indication may be included in the handover configuration information.

In step 22-50, if two-step random access is performed, the UE 22-05 may transmit msgA to the target cell 22-15 in step 22-55. The msgA may include a preamble, an RRC message, and an RRCReconfigurationComplete message, which are provided by the target cell 22-15. The base station (e.g., the target cell 22-15) that has successfully received msgA may transmit a predetermined response message to the UE 22-05 in step 22-60. Since the two-step random access being performed is contention-free access, the base station may not need to transmit msgB including information on msg4 and RAR. Instead, one of the following options can be applied.

Option a: RAR including timing advance command and a UL grant. A temporary C-RNTI is not required.

Option b: A combination of a PDCCH including a C-RNTI indicating the UE performing the two-step random access based handover and a PDSCH including a timing advance command (MAC) CE transmitted according to scheduling information indicated by the C-RNTI.

If the two-step random access is successfully completed, the UE 22-05 may determine that the handover is successfully completed, and the UE 22-05 may stop the first timer.

If the two-step random access process is considered as failed according to a predetermined condition, the UE 22-05 may switch the two-step random access process to CFRA or CBRA and thus attempt a random access to the target cell 2245 in step 22-75. The predetermined conditions described above may denote:

- If, until the second timer expires (as indicated by reference numeral 22-65), the two-step random access process being performed is not considered to be successfully completed;
- If the measured RSRP of a reference signal to the target cell has a value smaller than the predetermined RSRP threshold value;
- If the two-step random access process fails a predetermined number of times; and
- If a message (fallbackRAR) indicating to switch to CFRA or CBRA is received from the target cell.

A predetermined RSRP threshold value or a predetermined number of times of failures may be included in configuration information for performing a handover, provided from the source cell 22-10. If a random access process is switched to CFRA or CBRA, the UE 22-05 may transmit the preamble to the target cell 22-15 in step 22-80. The target cell 22-15 may transmit a response message 22-85 for the preamble.

In step 22-90, the UE 22-05 may transmit msg3 including the RRCReconfigurationComplete message to the target cell 22-15, If the random access is successfully completed, the UE 22-05 determines that the handover is completed successfully and may stop the first timer.

If the first timer expires, the UE 22-05 may consider that the handover has failed as indicated by reference numeral 22-95).

According to an embodiment, without random access switching, the random access type determined at the beginning of the handover may be reattempted until the first timer expires.

Figure 23:
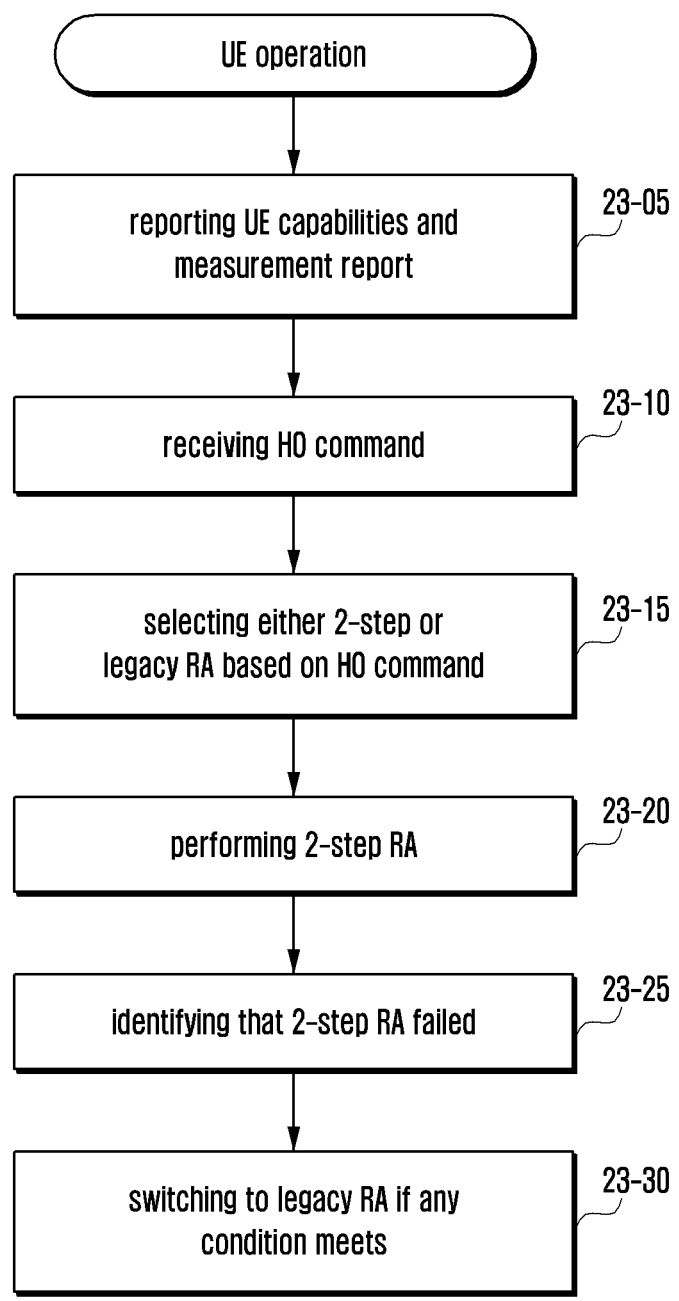
FIG. 23 is a flowchart illustrating a UE operation for performing a handover using two-step random access according to an embodiment.

FIG. 23 is a flowchart illustrating a UE operation for performing a handover using two-step random access according to an embodiment.

Referring to FIG. 23, in step 23-05, the UE reports capability information of the UE itself to the source cell. The capability information may include an indicator indicating whether the UE supports two-step random access. According to the cell measurement configuration information provided by the source cell, the UE may report the result of cell measurement to the source cell.

In step 23-10, the UE receives an HO command (IE ReconfigurationWithSync) from the source cell through an RRC message. The HO command may include handover configuration information. At this time, a first timer indicated in the configuration information may be started.

In step 23-15, the UE performs two-step random access to the target cell according to a predetermined rule for handover or performs CFRA or CBRA.

In step 23-20, the UE performs a process of two-step random access to the target cell. At this time, the UE may transmit msgA to the target cell.

In step 23-25, the UE considers that the two-step random access process has failed according to a predetermined condition.

In step 23-30, the UE may switch the two-step random access process to CFRA or CBRA until the first timer expires, and thus may reattempt random access to the target cell. Alternatively, without switching to CFRA or CBRA, the UE may reattempt the two-step random access process.

Figure 24:
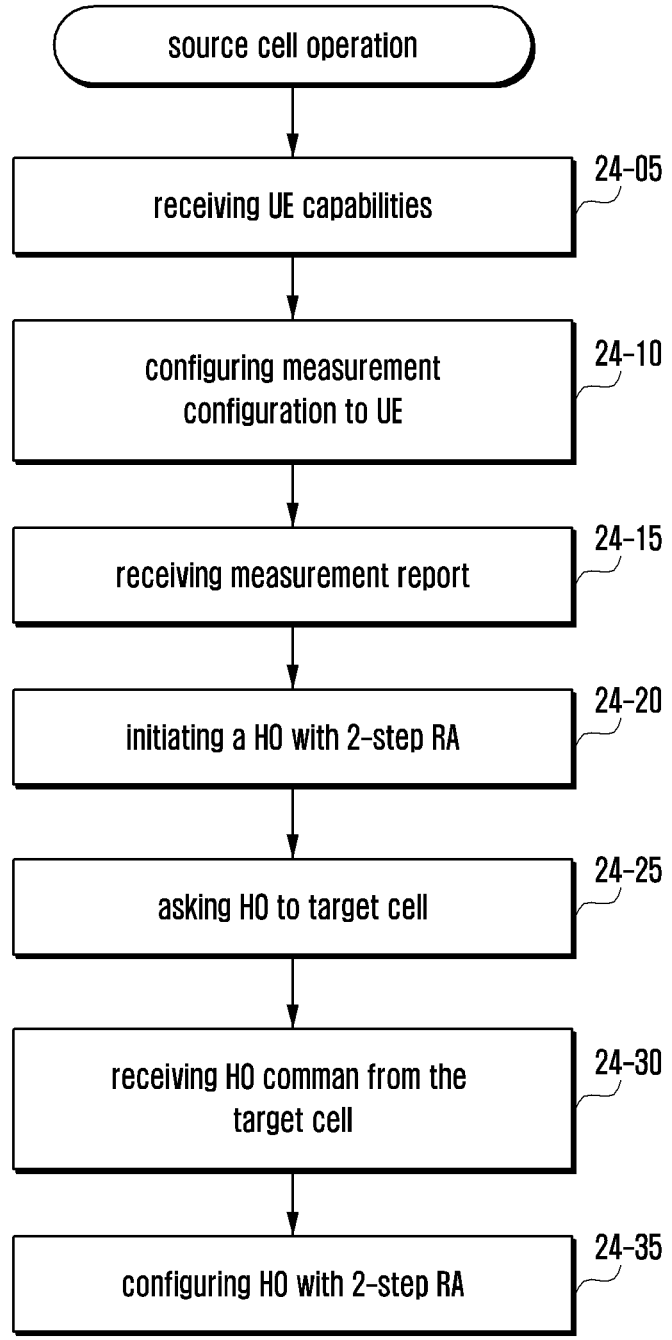
FIG. 24 is a flowchart illustrating a source cell operation for performing a handover using two-step random access according to an embodiment.

FIG. 24 is a flowchart illustrating a source cell operation for performing a handover using two-step random access according to an embodiment.

Referring to FIG. 24, in step 24-05, the source cell receives capability information from the UE. The capability information may include an indicator indicating whether the UE supports two-step random access.

In step 24-10, the source cell provides cell measurement configuration information to the UE.

In step 24-15, the source cell receives the result of cell measurement from the UE.

In step 24-20, the source cell triggers a handover for the UE together with two-step random access.

In step 24-25, the source cell requests handover from the target cell. The request may include an indicator for requesting two-step random access.

In step 24-30, the source cell receives an HO command from the target cell. The HO command may include configuration information required for performing two-step random access. Conventional CFRA-related configuration information may also be included in the HO command.

In step 24-35, the source cell forwards the HO command to the UE.

Figure 25:
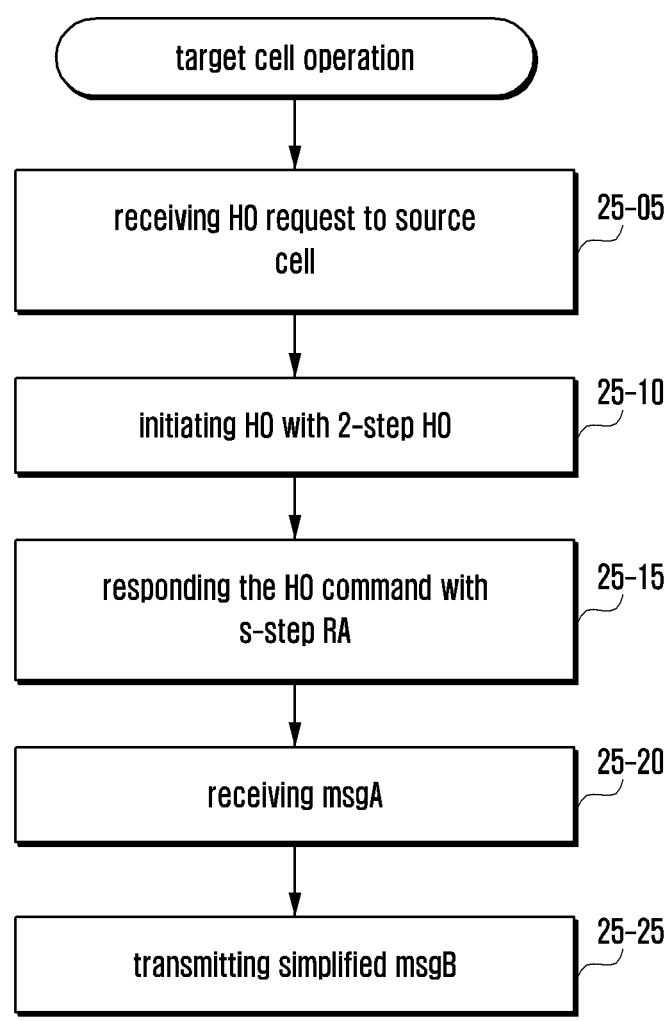
FIG. 25 is a flowchart illustrating a target cell operation for performing a handover using two-step random access according to an embodiment.

FIG. 25 is a flowchart illustrating a target cell operation for performing a handover using two-step random access according to an embodiment.

Referring to FIG. 25, in step 25-05, the target cell receives an inter-node message and a HandoverPreparationInformation message requesting handover from the source cell. The inter-node message and the HandoverPreparationInformation message may include an indicator requesting a two-step random access process.

In step 25-10, the target cell initiates a two-step random access based handover.

In step 25-15, the target cell transmits an HO command including two-step random access configuration information to the source cell.

In step 25-20, the target cell receives msgA from the UE.

In step 25-25, the target cell transmits a response message for msgA to the UE.

Figure 26:
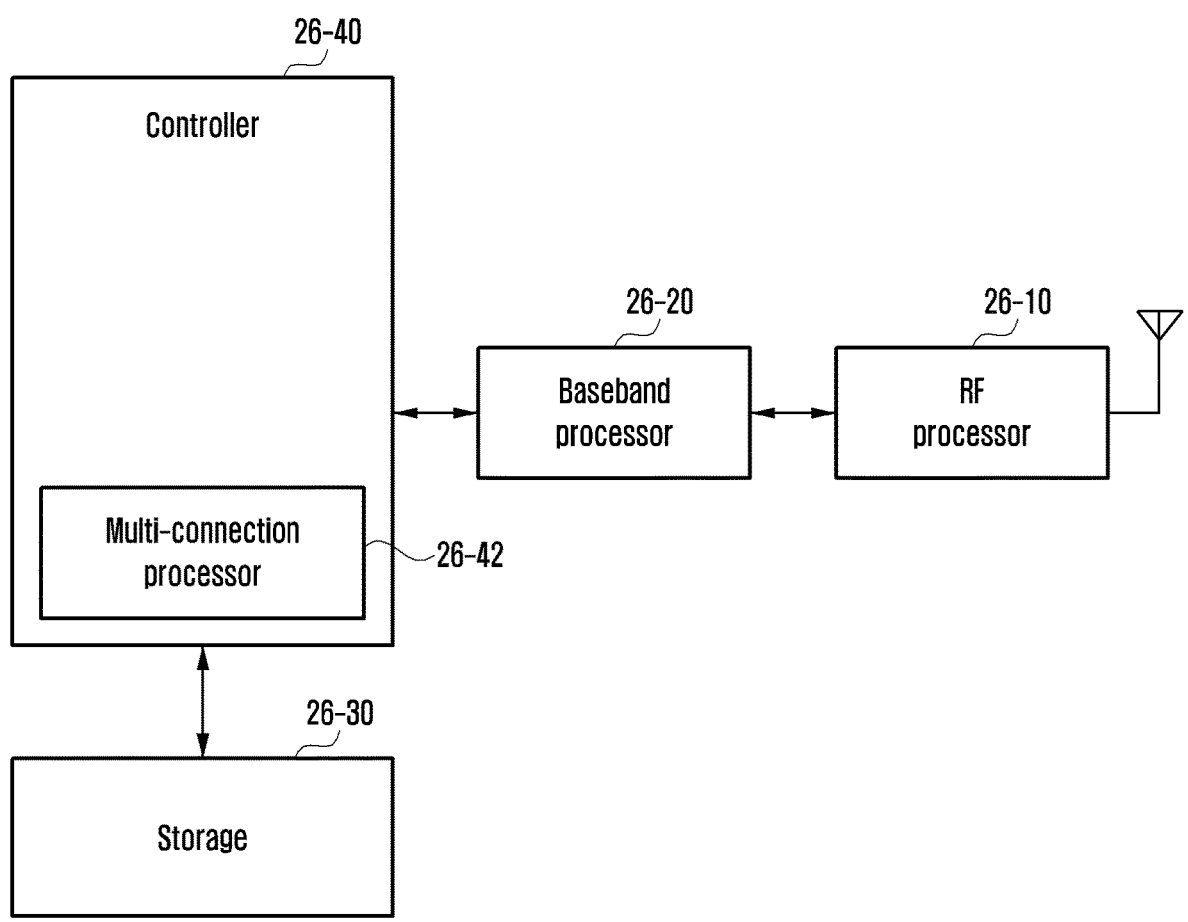
FIG. 26 illustrates a UE according to an embodiment.

FIG. 26 illustrates a UE according to an embodiment.

Referring to FIG. 26, the UE includes an RF processor 26-10, a baseband processor 26-20, a storage 26-30, and a controller 26-40.

The RF processor 26-10 performs a signal transmission or reception function, such as band conversion and amplification of the signal, through a radio channel. That is, the RF processor 26-10 up-converts a baseband signal provided from the baseband processor 26-20 into an RF band signal and transmits the RF band signal through an antenna, and down-converts the RF band signal, received through the antenna, into a baseband signal. For example, the RF processor 26-10 may include a transmission filter, a reception filter, an amplifier, a mixer, an oscillator, a DAC, an ADC, etc. In FIG. 26, although only one antenna is illustrated, the UE may include a plurality of antennas. Further, the RF processor 26-10 may include a plurality of RF chains and may perform beamforming. For the beamforming, the RF processor 26-10 may adjust the phase and magnitude of each of the signals transmitted or received through a plurality of antennas or antenna elements. In addition, the RF processor may perform a MIMO operation, and may receive multiple layers at the time of performing the MIMO operation.

The baseband processor 26-20 performs a function of conversion between a baseband signal and a bit string according to the physical layer standard of a system. For example, at the time of data transmission, the baseband processor 26-20 generates complex symbols by encoding and modulating a transmission bit stream. In addition, at the time of data reception, the baseband processor 26-20 reconstructs a reception bit string by demodulating and decoding the baseband signal provided from the RF processor 26-10. For example, according to an OFDM scheme, at the time of data transmission, the baseband processor 26-20 generates complex symbols by encoding and modulating a transmission bit stream, maps the complex symbols onto sub-carriers, and then configures OFDM symbols by performing an IFFT operation and insertion of a CP. At the time of data reception, the baseband processor 26-20 divides the baseband signal provided from the RF processor 26-10 in units of OFDM symbols, reconstructs the signals, which have been mapped onto the sub-carriers, through an ITT operation, and then reconstructs the reception bit string by demodulating and decoding the mapped signals.

The baseband processor 26-20 and the RF processor 26-10 transmit or receive a signal as described above. Accordingly, each of the baseband processor 26-20 and the RF processor 26-10 may be referred to as a transmitter, a receiver, a transceiver, or a communication unit. Further, at least one of the baseband processor 26-20 and the RE processor 26-10 may include a plurality of communication modules in order to support different RATs. In addition, at least one of the baseband processor 26-20 and the RF processor 26-10 may include different communication modules in order to process signals in different frequency bands. For example, the different RATs may include a wireless LAN (e.g., IEEE 802.11), a cellular network (e.g., LTE), etc. In addition, the different frequency bands may include an SHE (e.g., 2.NRHz, NRHz) band, and a millimeter wave (e.g., 60 GHz) band.

The storage 26-30 stores data, such as a basic program, an application, and configuration information for performing the UE operation. The storage 26-30 may store information related to a second access node for performing wireless communication using a second RAT. The storage 26-30 provides stored data at the request of the controller 26-40.

The controller 26-40 controls the overall operation of the UE. That is, the controller 26-40 may control other elements included in the UE to perform an operation for operating the UE. For example, the controller 26-40 transmits or receives a signal through the baseband processor 26-20 and the RE processor 26-10. The controller 26-40 records or reads data in or from the storage 26-30. The controller 26-40 may include at least one processor. The controller 26-40 includes a multi-connection processor 26-42 for performing control for communication and an AP for controlling a higher layer such as an application.

Figure 27:
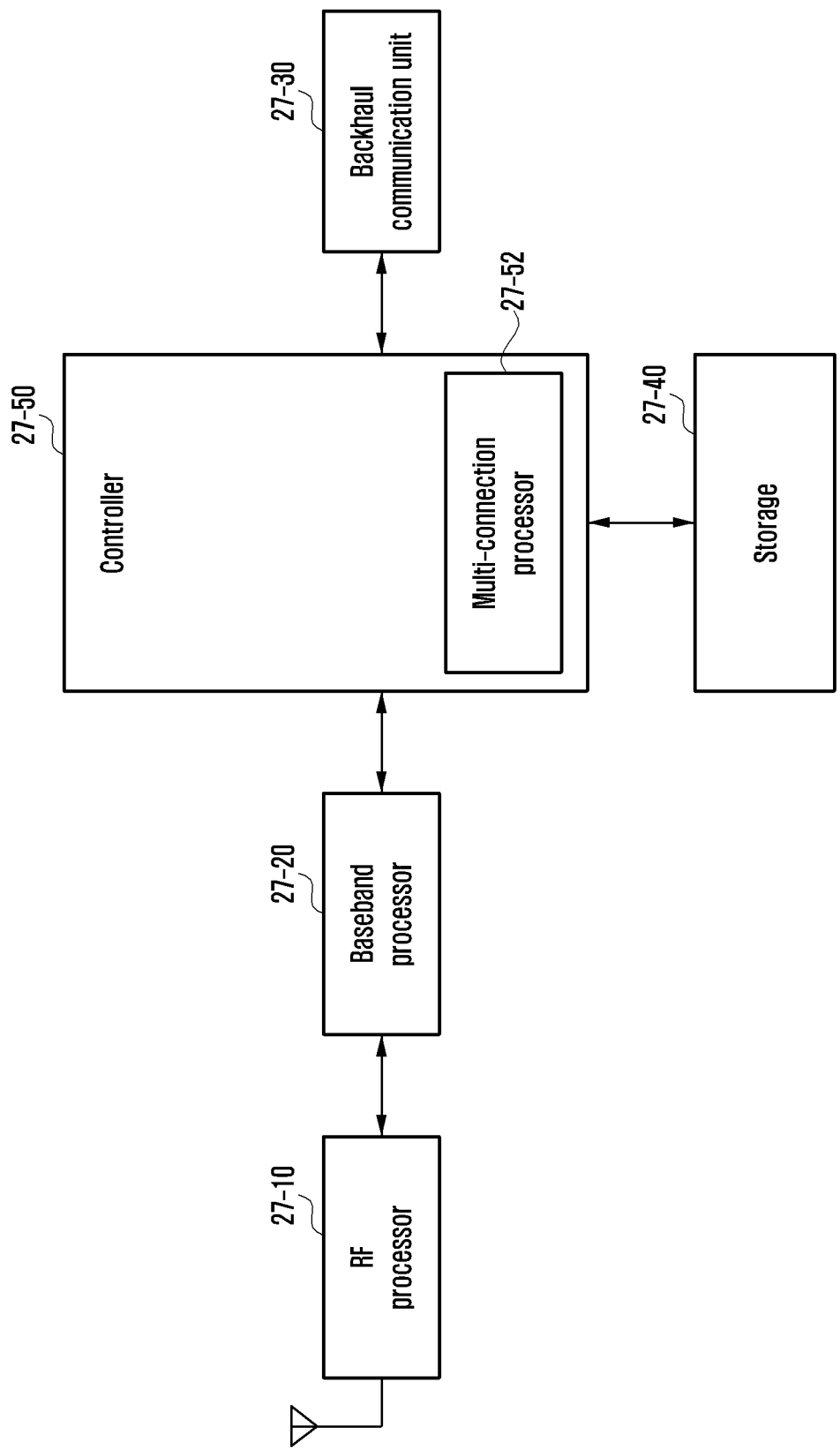
FIG. 27 illustrates a base station according to an embodiment.

FIG. 27 illustrates a base station according to an embodiment.

Referring to FIG. 27, the base station includes an RF processor 27-10, a baseband processor 27-20, a backhaul communication unit 27-30, a storage 27-40, and a controller 27-50.

The RF processor 27-10 performs a function for transmitting or receiving a signal, such as band conversion and amplification of the signal, through a radio channel. The RF processor 27-10 up-converts a baseband signal provided from the baseband processor 27-20 into an RF band signal and transmits the RF band signal through an antenna, and down-converts the RF band signal, received through the antenna, into a baseband signal. The RF processor 27-10 may include a transmission filter, a reception filter, an amplifier, a mixer, an oscillator, a DAC, an ADC, etc. In FIG. 27, although only one antenna is illustrated, the base station may include a plurality of antennas, and the RF processor 27-10 may include a plurality of RF chains. The RF processor 27-10 may perform beamforming. For the beamforming, the RF processor 27-10 may adjust the phase and magnitude of each of the signals transmitted or received through a plurality of antennas or antenna elements. In addition, the RF processor may perform a downlink MIMO operation by transmitting one or more layers.

The baseband processor 27-20 performs a function of conversion between a baseband signal and a bit string according to the physical layer standard of a first RAT. For example, at the time of data transmission, the baseband processor 27-20 generates complex symbols by encoding and modulating a transmission bit stream. At the time of data reception, the baseband processor 27-20 reconstructs a reception bit string by demodulating and decoding the baseband signal provided from the RF processor 27-10. For example, according to an OFDM scheme, at the time of data transmission, the baseband processor 27-20 generates complex symbols by encoding and modulating a transmission bit stream, maps the complex symbols onto sub-carriers, and then configures OFDM symbols by performing an IFFT operation and CP insertion. At the time of data reception, the baseband processor 27-20 divides the baseband signal provided from the RF processor 27-10 in units of OFDM symbols, reconstructs the signals, which have been mapped onto the sub-carriers, through an ITT operation, and then reconstructs the reception bit string by demodulating and decoding the mapped signals. The baseband processor 27-20 and the RE processor 27-10 transmit or receive a signal as described above. Accordingly, each of the baseband processor 27-20 and the RF processor 27-10 may be referred to as a transmitter, a receiver, a transceiver, a communication unit, or wireless communication unit.

The backhaul communication unit 27-30 provides an interface for communication with other nodes in a network. That is, the backhaul communication unit 27-30 converts a bit string, transmitted from a main base station to another node, for example, an auxiliary base station, a core network, etc., into a physical signal, and converts the physical signal, received from the another node, into a bit string.

The storage 27-40 stores data, such as a basic program, an application, and configuration information for performing the operation of a main base station. The storage 27-40 may store information on a bearer allocated to the connected UE, a measurement result reported by the connected UE, etc. The storage 27-40 may store information serving as a criterion for determining whether to provide or terminate multiple connections to the UE. In addition, the storage 27-40 provides stored data at the request of the controller 27-50.

The controller 27-50 controls the overall operation of the main base station. That is, the controller 27-50 may control other elements included in a base station to perform an operation for operating the base station. For example, the controller 27-50 transmits or receives a signal through the baseband processor 27-20 and the RF processor 27-10, or through the backhaul communication unit 27-30. In addition, the controller 27-50 records or reads data in or from the storage 27-40. To this end, the controller 27-50 includes a multi-connection processor 27-52.

Methods according to embodiments described in the claims or specification of the disclosure may be implemented in the form of hardware, software, or a combination of hardware and software.

In the case of implementing in software, a non-transitory computer-readable storage medium or computer program product storing one or more programs (software modules) may be provided. One or more programs stored in a non-transitory computer-readable storage medium or computer program product are configured to be executable by one or more processors in an electronic device. One or more programs include instructions that cause an electronic device to execute methods according to embodiments described in the claims or specification of the disclosure.

Such programs (software modules, software) include random access memory, non-volatile memory including flash memory, read only memory (ROM), and electrically erasable programmable read only memory (EEPROM), magnetic disc storage device, compact disc-ROM (CD-ROM), digital versatile discs (DVDs) or another type of optical storage device, or a magnetic cassette. Alternatively, such programs may be stored in a memory configured by a combination of some or all of these devices. In addition, a plurality of configuration memories may be included.

In addition, the program may be stored in an attachable storage device, which is accessible through a communication network such as the Internet, an intranet, a LAN, a wide LAN (WLAN), or a storage area network (SAN), or a communication network configured by a combination thereof. Such a storage device may be connected to a device for performing an embodiment through an external port. In addition, a separate storage device in the communication network may be connected to a device that performs embodiments of the disclosure.

In the disclosure, the terms "computer program product" or "non-transitory computer-readable recording medium" are used for entirely referring to a medium such as a memory, a hard disk installed in a hard disk drive, and a signal. The "computer program product" or "non-transitory computer-readable recording medium" are elements provided to a software computer system, which includes instructions for configuring the length of a timer for receiving missing data packets based on network metrics corresponding to the determined event according to the disclosure.

In the above-described embodiments of the disclosure, an element may be expressed in the singular or the plural according to presented detailed embodiments. However, the singular form or plural form is selected appropriately to the presented situation for the convenience of description, and the disclosure is not limited by elements expressed in the singular or the plural, Therefore, either an element expressed in the plural may also include a single element or an element expressed in the singular may also include multiple elements.

According to the disclosure, in a next-generation mobile communication system in which a cell supporting an NR-Lite UE and a cell that cannot support an NR-Lite UE coexist, a method and an apparatus capable of determining, by the NR-Lite UE, a cell, among neighboring cells, which can support the NR-Lite UE itself are provided.

In addition, the disclosure provides an apparatus and a method capable of effectively providing a service in a mobile communication system.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a communication system, the method comprising:
   receiving, from a source base station, configuration information for a handover to a target base station, the configuration information including information on a first type random access procedure and a second type random access procedure;
   identifying a type of random access procedure as the first type random access procedure, in response to a reference signal received power (RSRP) being above a threshold, wherein the threshold is included in a system information block;
   performing the first type random access procedure with the target base station;
   storing uplink message size information associated with the performed first type random access procedure for a random access (RA) report; and
   transmitting the RA report including the uplink message size information associated with the performed first type random access procedure stored for the RA report, in response to a request to report the RA report.

2. The method of claim 1, wherein the uplink message size information associated with the performed first type random access procedure for the RA report includes a size of message A (Msg A) for the first type random access.

3. The method of claim 1, further comprising performing the second type random access procedure in response to the first type random access procedure being identified as not completed,
   wherein the configuration information further includes a maximum number of preamble transmissions for the first type random access procedure, and
   wherein the first type random access procedure is identified as not completed in response to a number of preamble transmission being above the maximum number.

4. The method of claim 1, further comprising:
   storing information on the performed first type random access procedure for a radio link failure (RLF) report, based on detection of an RLF associated with the first type random access procedure; and
   transmitting the RLF report including the information on the performed first type random access procedure stored for the RLF report, in response to a request to report the RLF report.

5. The method of claim 1, wherein the configuration information further includes random access parameters for each of the first type random access procedure and the second type random access procedure, and
   wherein the random access parameters include:
   a preamble index,
   a synchronization signal/physical broadcast channel (SS/PBCH) block index,
   a random access occasion, a physical random access channel (PRACH) mask index, and
a number of SS/PBCH blocks per the random access occasion.

6. A method performed by a target base station in a communication system, the method comprising:
receiving, from a source base station, a message requesting a handover from the source base station to the target base station;
transmitting, to the source base station, configuration information including information on a first type random access procedure and a second type random access procedure;
performing the first type random access procedure with a terminal based on a reference signal received power (RSRP) being above a threshold, the threshold being included in a system information block; and
receiving, from the terminal, a random access (RA) report including uplink message size information associated with the performed first type random access procedure, in response to a request to report the RA report,
wherein the configuration information is transmitted from the source base station to the terminal.

7. The method of claim 6, wherein the second type random access procedure is performed by the terminal, in response to the first type random access procedure being identified as not completed,
wherein the configuration information further includes a maximum number of preamble transmissions for the first type random access procedure, and
wherein the first type random access procedure is identified as not completed in response to a number of preamble transmission being above the maximum number.

8. The method of claim 6, wherein the configuration information further includes random access parameters for each of the first type random access procedure and the second type random access procedure, and
wherein the random access parameters include:
a preamble index,
a synchronization signal/physical broadcast channel (SS/PBCH) block index,
a random access occasion,
a physical random access channel (PRACH) mask index, and
a number of SS/PBCH blocks per the random access occasion.

9. A method performed by a source base station in a communication system, the method comprising:
transmitting, to a target base station, a message requesting a handover from the source base station to the target base station;
receiving, from the target base station, configuration information including information on a first type random access procedure and a second type random access procedure; and
transmitting, to a terminal, the configuration information,
wherein a type of random access procedure associated with the terminal and the target base station is a first type random access procedure based on a reference signal received power (RSRP) being above a threshold, the threshold being included in a system information block, and
wherein uplink message size information associated with the performed first type random access procedure is stored in the terminal for a random access (RA) report, and transmitted by the terminal in response to a request to report the RA report.

10. The method of claim 9, wherein the second type random access procedure is performed by the terminal, in response to the first type random access procedure being identified as not completed,
wherein the configuration information further includes a maximum number of preamble transmissions for the first type random access procedure, and
wherein the first type random access procedure is identified as not completed in response to a number of preamble transmission being above the maximum number.

11. A terminal in a communication system, the terminal comprising:
a transceiver; and
a controller configured to:
receive, from a source base station, configuration information for a handover to a target base station, the configuration information including information on a first type random access procedure and a second type random access procedure,
identify a type of random access procedure as the first type random access procedure, in response to a reference signal received power (RSRP) being above a threshold, wherein the threshold is included in a system information block, and
perform the first type random access procedure with the target base station,
store uplink message size information associated with the performed first type random access procedure for a random access (RA) report, and
transmit the RA report including the uplink message size information associated with the performed first type random access procedure stored for the PA report, in response to a request to report the RA report.

12. The terminal of claim 11, wherein the uplink message size information associated with the performed first type random access procedure for the RA report includes a size of message A (Msg A) for the first type random access.

13. The terminal of claim 11, wherein the controller is further configured to perform the second type random access procedure in response to the first type random access procedure being identified as not completed,
wherein the configuration information further includes a maximum number of preamble transmissions for the first type random access procedure, and
wherein the first type random access procedure is identified as not completed in response to a number of preamble transmission being above the maximum number.

14. The terminal of claim 11, wherein the controller is further configured to:
store information on the performed first type random access procedure for a radio link failure (RLF) report, based on detection of an RLF associated with the first type random access procedure, and
transmit the RLF report including the information on the performed first type random access procedure stored for the RLF report, in response to a request to report the RLF report.

15. The terminal of claim 11, wherein the configuration information further includes random access parameters for each of the first type random access procedure and the second type random access procedure, and wherein the random access parameters include:
- a preamble index,
- a synchronization signal/physical broadcast channel (SS/PBCH) block index,
- a random access occasion,
- a physical random access channel (PRACH) mask index, and
- a number of SS/PBCH blocks per the random access occasion.

16. A target base station in a communication system, the target base station comprising:
  a transceiver; and
  a controller configured to:
    receive, from a source base station, a message requesting a handover from the source base station to the target base station,
    transmit, to the source base station, configuration information including information on a first type random access procedure and a second type random access procedure,
    perform the first type random access procedure with a terminal, based on a reference signal received power (RSRP) being above a threshold, the threshold being included in a system information block, and
    receive, from the terminal, a random access (RA) report including uplink message size information associated with the performed first type random access procedure, in response to a request to report the RA report,
  wherein the configuration information is transmitted from the source base station to the terminal.

17. The target base station of claim 16, wherein the second type random access procedure is performed by the terminal, in response to the first type random access procedure being identified as not completed,
  wherein the configuration information further includes a maximum number of preamble transmissions for the first type random access procedure, and
  wherein the first type random access procedure is identified as not completed in response to a number of preamble transmission being above the maximum number.

18. The target base station of claim 16, wherein the configuration information further includes random access parameters for each of the first type random access procedure and the second type random access procedure, and wherein the random access parameters include:
- a preamble index,
- a synchronization signal/physical broadcast channel (SS/PBCH) block index,
- a random access occasion,
- a physical random access channel (PRACH) mask index, and
- a number of SS/PBCH blocks per the random access occasion.

19. A source base station in a communication system, the source base station comprising:
  a transceiver; and
  a controller configured to:
    transmit, to a target base station, a message requesting a handover from the source base station to the target base station,
    receive, from the target base station, configuration information including information on a first type random access procedure and a second type random access procedure, and
    transmit, to a terminal, the configuration information,
  wherein a type of random access procedure associated with the terminal and the target base station is a first type random access procedure based on a reference signal received power (RSRP) being above a threshold, the threshold being included in a system information block, and
  wherein uplink message size information associated with the performed first type random access procedure is stored in the terminal for a random access (RA) report, and transmitted by the terminal in response to a request to report the RA report.

20. The source base station of claim 19, wherein the second type random access procedure is performed by the terminal, in response to the first type random access procedure being identified as not completed,
  wherein the configuration information further includes a maximum number of preamble transmissions for the first type random access procedure, and
  wherein the first type random access procedure is identified as not completed in response to a number of preamble transmission being above the maximum number.

* * * * *